(12) United States Patent
Dickson

(10) Patent No.: US 11,593,463 B2
(45) Date of Patent: Feb. 28, 2023

(54) EXECUTION TYPE SOFTWARE LICENSE MANAGEMENT

(71) Applicant: The Boeing Company, Chicago, IL (US)

(72) Inventor: Richard J. Dickson, Mill Creek, WA (US)

(73) Assignee: THE BOEING COMPANY, Chicago, IL (US)

( * ) Notice: Subject to any disclaimer, the term of this patent is extended or adjusted under 35 U.S.C. 154(b) by 442 days.

(21) Appl. No.: 16/711,290

(22) Filed: Dec. 11, 2019

(65) Prior Publication Data

US 2021/0182407 A1 Jun. 17, 2021

(51) Int. Cl.
*G06F 21/12* (2013.01)
*G06F 21/60* (2013.01)
*G06F 9/445* (2018.01)

(52) U.S. Cl.
CPC ............ *G06F 21/121* (2013.01); *G06F 9/445* (2013.01); *G06F 21/602* (2013.01); *G06Q 2220/18* (2013.01)

(58) Field of Classification Search
None
See application file for complete search history.

(56) References Cited

U.S. PATENT DOCUMENTS

| | | | | |
|---|---|---|---|---|
| 5,745,879 A * | 4/1998 | Wyman | ................... | G06Q 30/04 726/4 |
| 5,925,127 A * | 7/1999 | Ahmad | ................. | G06F 21/121 726/31 |
| 8,024,571 B2 * | 9/2011 | Round | ................... | G06F 21/121 713/168 |
| 8,117,086 B1 * | 2/2012 | Utz | ..................... | G06Q 30/0635 705/26.81 |
| 8,769,299 B1 * | 7/2014 | Dickson | ................ | G06F 21/105 713/189 |
| 9,569,751 B2 * | 2/2017 | Steiner | ................... | G06Q 10/10 |
| 9,785,928 B1 * | 10/2017 | Brandwine | ........... | G06F 21/629 |

(Continued)

OTHER PUBLICATIONS

Kediyal et al (Licit: Administering Usage Licenses in Federated Environments) (Year: 2014).*

(Continued)

*Primary Examiner* — Mamon Obeid
(74) *Attorney, Agent, or Firm* — MH2 Technology Law Group LLP

(57) ABSTRACT

Techniques for managing licensing of a software application that includes a plurality of executables are presented. The techniques can include detecting an initiation of the software application on a client computer; obtaining a license for a usage of a first executable of the plurality of executables; detecting an initiation of at least a second executable; obtaining execution type data for the second executable specifying one of: a license for a usage of the second executable is not required if an instance of the second executable is executing on the client computer, or a license for a usage of the second executable is not required if at least one executable of the plurality of executables is executing on the client computer; determining, based on the execution type data, that a license for a usage of the second executable is not required; and executing the second executable.

20 Claims, 12 Drawing Sheets

(56) References Cited

U.S. PATENT DOCUMENTS

| | | | | |
|---|---|---|---|---|
| 9,971,881 B1* | 5/2018 | Adam | | G06F 21/604 |
| 10,015,271 B1* | 7/2018 | Chang | | G06F 16/176 |
| 11,281,442 B1* | 3/2022 | Tal | | H04L 67/51 |
| 2002/0052885 A1* | 5/2002 | Levy | | H04N 1/32144 |
| 2002/0083003 A1* | 6/2002 | Halliday | | G06Q 30/04 |
| | | | | 705/52 |
| 2003/0083995 A1* | 5/2003 | Ramachandran | | G06Q 30/04 |
| | | | | 705/52 |
| 2003/0182563 A1* | 9/2003 | Liu | | G06F 8/60 |
| | | | | 713/191 |
| 2004/0128370 A1* | 7/2004 | Kortright | | H04L 41/082 |
| | | | | 709/224 |
| 2005/0049973 A1* | 3/2005 | Read | | G06F 21/10 |
| | | | | 705/59 |
| 2005/0050319 A1* | 3/2005 | Suraski | | H04L 67/142 |
| | | | | 726/4 |
| 2005/0114226 A1* | 5/2005 | Tripp | | G06Q 30/0609 |
| | | | | 705/26.35 |
| 2005/0240906 A1* | 10/2005 | Kinderknecht | | G06F 9/4843 |
| | | | | 717/136 |
| 2006/0225138 A1* | 10/2006 | Toyohara | | G06Q 30/0601 |
| | | | | 726/27 |
| 2007/0198423 A1* | 8/2007 | Carbone | | G06F 21/10 |
| | | | | 705/52 |
| 2008/0155698 A1* | 6/2008 | Round | | G06F 21/16 |
| | | | | 726/26 |
| 2008/0177560 A1* | 7/2008 | Niinomi | | G06F 21/10 |
| | | | | 705/75 |
| 2010/0031352 A1* | 2/2010 | Kethireddy | | G06F 21/105 |
| | | | | 705/310 |
| 2010/0070971 A1* | 3/2010 | Shlomai | | G06F 16/10 |
| | | | | 718/1 |
| 2010/0251379 A1* | 9/2010 | Myers | | G06F 16/252 |
| | | | | 726/26 |
| 2012/0173356 A1* | 7/2012 | Fan | | H04N 21/2743 |
| | | | | 705/26.1 |
| 2012/0185820 A1* | 7/2012 | Kadiyala | | G06F 8/37 |
| | | | | 717/100 |
| 2014/0215272 A1* | 7/2014 | Bauer | | G06F 11/0709 |
| | | | | 714/37 |
| 2014/0245034 A1* | 8/2014 | Rotem | | G06F 1/26 |
| | | | | 713/300 |
| 2014/0283011 A1* | 9/2014 | Orona | | G16H 40/67 |
| | | | | 726/18 |
| 2015/0149363 A1* | 5/2015 | Womack | | G06F 21/105 |
| | | | | 705/310 |
| 2015/0186625 A1* | 7/2015 | Li | | G06F 21/105 |
| | | | | 726/27 |
| 2016/0259922 A1* | 9/2016 | Matsuo | | H04L 63/10 |
| 2017/0124296 A1 | 5/2017 | Baldwin | | |
| 2017/0149746 A1* | 5/2017 | Dickson | | H04L 63/123 |
| 2018/0322260 A1* | 11/2018 | Adam | | G06F 21/604 |
| 2019/0294778 A1* | 9/2019 | De Gaetano | | G06F 21/552 |
| 2020/0201614 A1* | 6/2020 | Wang | | G06F 8/61 |
| 2020/0285716 A1 | 9/2020 | Punathil et al. | | |
| 2021/0012445 A1* | 1/2021 | Bartfai-Walcott | | |
| | | | | G06Q 20/1235 |
| 2021/0073354 A1* | 3/2021 | Tyagi | | G06F 11/3409 |
| 2021/0182249 A1* | 6/2021 | Dickson | | G06F 16/211 |
| 2021/0182363 A1* | 6/2021 | Dickson | | G06F 21/602 |
| 2021/0182364 A1* | 6/2021 | Dickson | | G06F 11/3055 |
| 2021/0182407 A1* | 6/2021 | Dickson | | G06F 9/445 |

OTHER PUBLICATIONS

Extended European Search Report dated Mar. 12, 2021 in related European Application No. 20198155.2 (8 pages).
Extended European Search Report dated Mar. 12, 2021 in corresponding European Application No. 20198155.2, 8 pages.
Ron White, How Computers Work, 7th edition, Que Corp, 2004 (Year: 2004), pp. VI-XIII, 2-13, 79, 80, and 390-407.

* cited by examiner

EXECUTION TYPE SOFTWARE LICENSE MANAGEMENT

FIELD

This disclosure relates to software licensing, in particular, ensuring compliance with software licensing requirements.

BACKGROUND

Some known techniques for software license management are encryption-based, operating by encapsulating the executable binaries within an encrypted runtime environment. When the encapsulated binary is executed, the encapsulated shell sends a message to a license server requesting an application software license. If a license is available, the license server sends a reply to the encapsulated runtime environment with the encryption key to unlock the application executable and execute the application binary. If a license is not available, then the license server sends a reply to the encapsulated runtime environment to display a license denied message to the end user. Once the executable terminates, the runtime environment will send a license checkin message to the license server.

Some known techniques for software license checkout and checkin embed, within a software application executable, a set of tools to perform checkout and checkin license entitlements from a license server. These embedded utilities, which may decrypt the encrypted application executable, are usually provided by a license management system vendor that does not develop the application executable itself. Consequently, such known techniques may not be available for managing licensing for arbitrary software applications. Even if such techniques are available for a particular software application, because the license management vendor provides the embedded tools, the associated costs are passed on to the user, even if the user does not utilize that particular software application.

License servers may be used when an entity requires an automated method for enforcing the terms and conditions of vendor application license agreements. However, the vast majority of software subject to software license agreements is intended to be sold and distributed on a one-license-per-machine basis. Such software is therefore typically not provisioned to work with license servers.

In order to make a typical application work with an encryption-based license server, an administration team for the license must acquire the tools to encrypt applications from the license manager vendor, encrypt the suite of applications they want the company to use, and then distribute only those encrypted applications. Such encryption-based techniques thus require a non-trivial amount of administrative effort. Because such techniques involve modifying the executable with encryption, they may in some circumstances result in program faults. As a result, customer support for the application software by the application vendor may be withheld because the vendor may consider such encryption methods unsupportable and deny providing technical assistance.

It is a common practice for application vendors to specify a list of multiple terms and conditions for purchased software license agreements. These may include limits on the number of simultaneous uses of a license (concurrent jobs, concurrent nodes, and concurrent users), limits on which nodes may have access to the licenses, limits on which users can have access to the licenses, and/or limits on whether a license can be deployed domestically or internationally. In addition, vendors can specify that a set of licenses can only be used by persons that are a member of a particular group, and/or used by persons that are a member of a particular skill set. Generally, these terms and conditions are conjunctive ("and") conditions and not disjunctive ("or") conditions.

However, existing software license management solutions at most provide the ability to evaluate a license usage request based on a single criterion. The type of license entitlement criterion used by existing solutions include concurrent jobs, or concurrent nodes, or concurrent users, or a list of nodes, or a list of users. Existing solutions require that for a given application, only one license entitlement criterion be used to determine whether a license entitlement is granted or rejected. In particular, the vast majority of application license managers use some form of a concurrent software license—a single criterion—to determine software entitlement outcomes.

Further, it is common for corporations to deploy software licenses to clients so as to provoke violations of the terms and conditions, which can result in huge penalties for non-compliance. For example, the vast majority of software applications do not have automated checkout/checkin license management software to enforce the relevant terms and conditions. Moreover, software vendors frequently add combinations of license restrictions, such as restrictions on a list of clients and a list of user account names.

To optimize the deployment and use of software licenses, it is desirable to know where the available license entitlements are stored, where the licenses are deployed, who is using the license, how often the licenses are being used, and how much license maintenance is required. Further, one should be able to identify unused or little used licenses for all types of software. Solutions exist to capture some of this information, for concurrent software licenses only. However, software entitlements based on only concurrent software licenses account for about 2% of software titles. The remaining software titles may be subject to software license agreement terms and conditions that are node based, user based, token based, enterprise based, group based, skill based, pool based, site based, or domain based.

Large companies need to allocate costs of software licensing among their various projects for accounting purposes. This is particularly important when the software licensing terms charge on a per-use, per-job, or per-hour basis. Employees may work on a variety of projects and should be equipped with tools to account for costs appropriately. For companies with a large selection of chargecodes (alternatively charge codes), the glut of choices increases the burden of finding the desired chargecode and the risk of electing a wrong line in error. Where software license managers allow chargecode management at all, the typical solutions involve multiple transactions between the user and the license server. The user may send a request for available chargecodes, the server may respond to the request, and the user may send an update, which the server may or may not acknowledge. On the face of it, these transactions may appear nominal, but when a server may need to process tens of thousands of requests an hour, any transaction other than a license checkin/checkout will have a negative effect on the maximum throughput of license requests that can be processed in an hour.

Software license entitlement management services may be performed on multiple license entitlement servers, which require synchronized license management configurations. Maintaining such license management configurations can be time consuming and error prone. In addition, managing and supporting hundreds of thousands to millions of clients is extremely labor intensive and time consuming. Further, troubleshooting, debugging, and resolution of client software can be very complicated.

Typically, application service maintenance support is performed by remotely logging into the target and searching for potential misconfigurations. This is frequently very labor intensive to diagnose and/or update. In addition, obtaining detailed diagnostic information for analysis is virtually non-existent, making it nearly impossible to replicate the issues/failures.

Software applications that are managed may include multiple executables. Such applications may be subject to software license agreements that specify complex rules for how many licenses to collect from a client to achieve full functionality of the application.

SUMMARY

According to some examples, a method of managing licensing of a software application including a plurality of executables is presented. The method includes: detecting an initiation of the software application on a client computer; obtaining, by the client computer, at least a license for a usage of a first executable of the plurality of executables, where the client computer executes at least the first executable of the plurality of executables; detecting an initiation of at least a second executable of the plurality of executables on the client computer; obtaining execution type data for the second executable, where the execution type data specifies one of: a license for a usage of the second executable is not required if an instance of the second executable is executing on the client computer, or a license for a usage of the second executable is not required if at least one executable of the plurality of executables is executing on the client computer; determining, based on the execution type data, that a license for a usage of the second executable is not required; and executing the second executable.

Various optional features of the above examples include the following. The execution type data can specify that a license for a usage of the second executable is not required if an instance of the second executable is executing on the client computer; and the determining can include determining that the first executable includes an instance of the second executable. The method can further include checking in the license for the usage of the first executable once both the first executable and the second executable are not executing. The execution type data can specify that a license for a usage of the second executable is not required if at least one executable of the plurality of executables is executing on the client computer; and the determining can include determining that the first executable is executing on the client computer. The method can include checking in the license for the usage of the first executable once all executables of the plurality of executables are not executing. The method can include detecting an initiation of at least a third executable of the plurality of executables on the client computer; obtaining execution type data for the third executable, where the execution type data specifies that a license for a usage of the third executable is always required; obtaining a license for a usage of the third executable; and executing the third executable. The plurality of executables can include at least two of: a third executable, where the third executable has associated execution type data for the third executable stored at the client computer, where the execution type data for the third executable specifies that a license for a usage of the third executable is not required if an instance of the third executable is executing on the client computer; a fourth executable, where the fourth executable has associated execution type data for the fourth executable stored at the client computer, where in the execution type data for the third executable specifies that a license for a usage of the fourth executable is not required if at least one executable of the plurality of executables is executing on the client computer; or a fifth executable, where the fifth executable has associated execution type data for the fifth executable stored at the client computer, where the execution type data for the fifth executable specifies that a license for a usage of the fifth executable is always required. The obtaining the license for the usage of at least the first executable of the plurality of executables on the client computer can include: determining that the software application is subject to a plurality of software license entitlement criteria defined by at least one software license agreement for the software application; requesting, from a server computer, a license for a usage of the software application on the client computer; and determining, by the server computer, that the usage of the software application on the client computer satisfies the plurality of software license entitlement criteria. The method can include suspending an execution process of the software application subsequent to the detecting the initiation of the software application on the client computer; and resuming the execution process of the software application in response to the obtaining the license for the usage the first executable of the plurality of executables on the client computer. The obtaining the execution type data for the second executable can include obtaining the execution type data for the second executable from a configuration file stored at the client computer.

According to some examples, a system for managing licensing of a software application including a plurality of executables is presented. The system include a client computer with computer executable software for tracking usage of the software application installed on the client. The client computer is configured by the computer executable software for tracking usage of the software application to perform actions including: detecting an initiation of the software application on the client computer; obtaining, by the client computer, at least a license for a usage of a first executable of the plurality of executables, where the client computer executes at least the first executable of the plurality of executables; detecting an initiation of at least a second executable of the plurality of executables on the client computer; obtaining execution type data for the second executable, where the execution type data specifies one of: a license for a usage of the second executable is not required if an instance of the second executable is executing on the client computer, or a license for a usage of the second executable is not required if at least one executable of the plurality of executables is executing on the client computer; determining, based on the execution type data, that a license for a usage of the second executable is not required; and executing the second executable.

Various optional features of the above examples include the following. The execution type data can specify that a license for a usage of the second executable is not required if an instance of the second executable is executing on the client computer; and the determining can include determining that the first executable includes an instance of the second executable. The actions can further include checking in the license for the usage of the first executable once both the first executable and the second executable are not executing. The execution type data can specify that a license for a usage of the second executable is not required if at least one executable of the plurality of executables is executing on the client computer; and the determining can include determining that the first executable is executing on the client computer. The actions can further include checking in the license for the usage of the first executable once all executables of the plurality of executables are not executing. The actions can further include: detecting an initiation of at least a third executable of the plurality of executables on the client computer; obtaining execution type data for the third executable, where the execution type data specifies that a license for a usage of the third executable is always required; obtaining a license for a usage of the third executable; and executing the third executable. The plurality of executables include at least two of: a third executable, where the third executable has associated execution type data for the third executable stored at the client computer, where the execution type data for the third executable specifies that a license for a usage of the third executable is not required if an instance of the third executable is executing on the client computer; a fourth executable, where the fourth executable has associated execution type data for the fourth executable stored at the client computer, where in the execution type data for the third executable specifies that a license for a usage of the fourth executable is not required if at least one executable of the plurality of executables is executing on the client computer; or a fifth executable, where the fifth executable has associated execution type data for the fifth executable stored at the client computer, where the execution type data for the fifth executable specifies that a license for a usage of the fifth executable is always required. The obtaining the license for the usage of at least the first executable of the plurality of executables on the client computer can include: determining that the software application is subject to a plurality of software license entitlement criteria defined by at least one software license agreement for the software application; requesting, from a server computer, a license for a usage of the software application on the client computer; and determining, by the server computer, that the usage of the software application on the client computer satisfies the plurality of software license entitlement criteria. The actions can further include: suspending an execution process of the software application subsequent to the detecting the initiation of the software application on the client computer; and resuming the execution process of the software application in response to the obtaining the license for the usage the first executable of the plurality of executables on the client computer. The obtaining the execution type data for the second executable can include obtaining the execution type data for the second executable from a configuration file stored at the client computer.

BRIEF DESCRIPTION OF THE DRAWINGS

The accompanying drawings, which are incorporated in and constitute a part of this specification, illustrate the present teachings and together with the description, serve to explain the principles of the disclosure.

Figure 1:
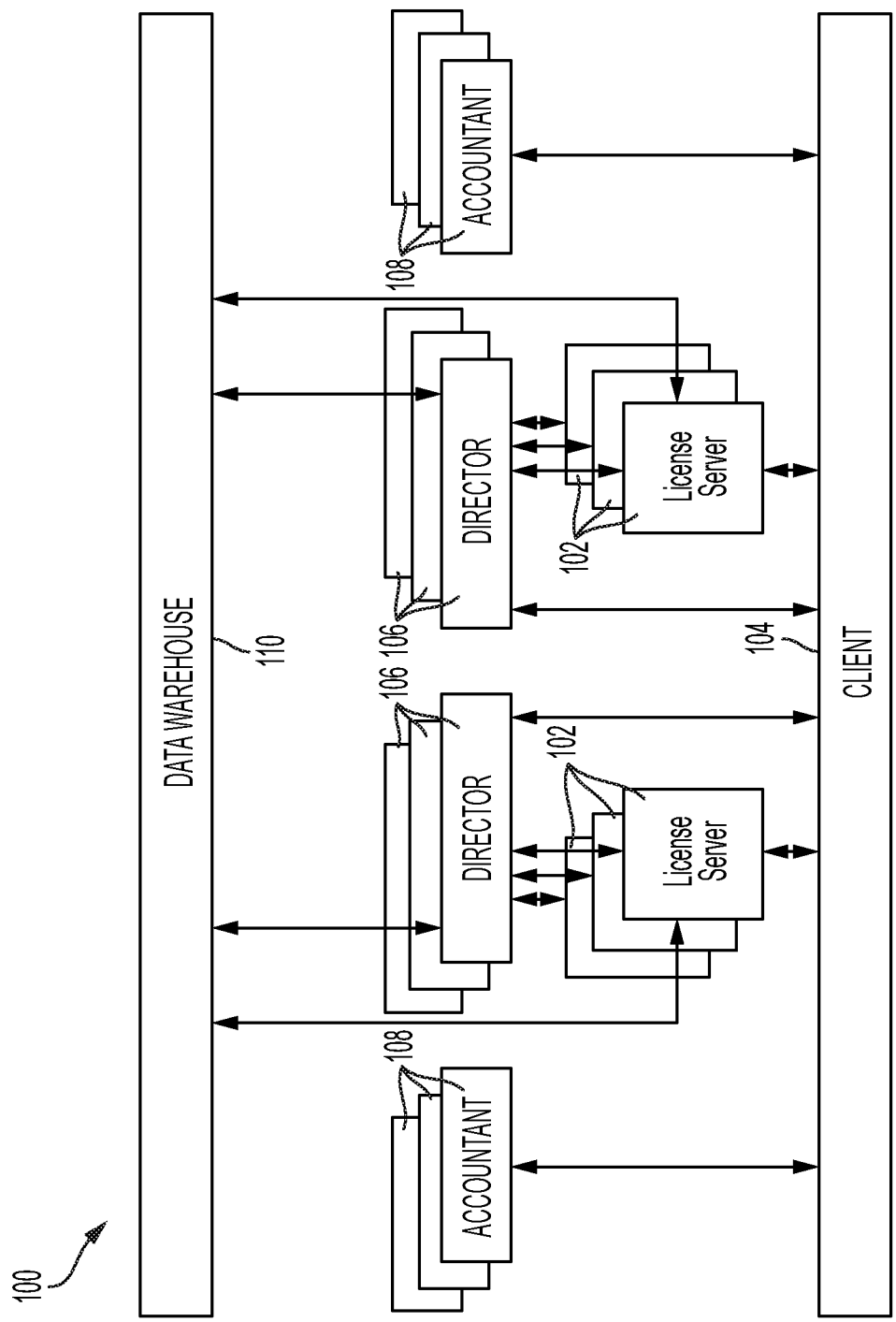
FIG. 1 is a schematic diagram of a system for managing software licenses according to some examples.

It should be noted that some details of the figures have been simplified and are drawn to facilitate understanding of the present teachings, rather than to maintain strict structural accuracy, detail, and scale.

DETAILED DESCRIPTION

Reference will now be made in detail to the disclosed examples, which are illustrated in the accompanying drawings. Wherever possible, the same reference numbers will be used throughout the drawings to refer to the same or like parts. In the following description, reference is made to the accompanying drawings that form a part thereof, and in which is shown by way of illustration specific examples. These examples are described in sufficient detail to enable those skilled in the art to practice them and it is to be understood that other examples may be utilized and that changes may be made without departing from the scope of the disclosure. The following description is, therefore, merely exemplary.

I. Software License Management

Some examples provide a solution for managing software licensing. Further, some examples, provide a software application license terms-and-conditions compliance enforcement application. Yet further, some examples provide a software application hybrid license entitlement manager. Some examples provide all of the above features and advantages. Companies that need to manage pools of software licenses, for example, may utilize the disclosed systems and methods, which use a client/server process-based method of enforcing vendor application license usage terms and conditions.

According to some examples, each client has tamper-resistant software loaded on it that monitors the processes being run by the client machine. When it detects the startup of a managed application process, it suspends the process momentarily and contacts a license server to attempt to check out a license for the usage of the managed application. If the license request is granted, it will allow the process to resume. If the license request is denied, the client software will terminate the process and notify the user. When the process terminates, the client software checks the license back in. According to some such examples, the managed software application is not encrypted.

Some examples provide the ability to determine whether a license for usage of a software application can be provided based on an evaluation of multiple license entitlement criteria that are defined by an associated software license agreement. That is, some examples provide the ability to enforce multiple simultaneous license entitlement criteria in an automated fashion. The criteria may include all, any, or any combination, of: concurrent jobs, concurrent nodes, concurrent users, a list of sites, a list of nodes, a list of users, a list of domains, a list of groups, a list of skills, and a list of pools. Some examples grant a license for usage only if the request indicates that such usage passes all ten simultaneous license entitlement criteria. This mechanism may be performed in response to a dynamic real time request for a license for usage of a software application from a client to a license server.

Some examples manage chargecodes in an efficient manner. Such examples may permit querying for, and selecting, valid chargecodes, without meaningful impact network traffic to the license server. Such examples may, in addition or in the alternative, allow for specifying filters to limit chargecode choices.

Some examples provide the ability to easily manage the synchronized license management configurations of multiple license entitlement servers. Further, some examples provide service support tools, which allow for remote diagnostic debug, configuration management, application license notifications and warnings, option selection, token license entitlement creation and deletion, inventory, and configuration updates.

These and other features and advantages are described in detail below.

FIG. 1 is a schematic diagram of a system 100 for managing software licenses (e.g. for controlling access to one or more software applications) according to some examples. Each block in FIG. 1 represents a computing device, and each arrow represents a communication channel, such as the internet. Thus, system 100 may be implemented in a distributed manner, e.g., over the internet. As shown, FIG. 1 depicts license servers 102, which are communicatively coupled to client 104. Servers 102 are further communicatively coupled to directors 106 and to data warehouse 110, which may be an information technologies service management data warehouse 110. Client 104 is also communicatively coupled to directors 106, and to accountant 108. Client 104 has client computer software installed thereon that directs client 104 (e.g., one or more electronic processors of client 104) to perform the actions described herein. Likewise, license server 102, directors 106, accountant 108, and data warehouse 110 have respective software installed thereon that directs the respective machines (e.g., their respective one or more electronic processors) to perform the actions described herein. The operation of license servers 102, client 104, directors 106, accountant 108, and data warehouse 110 is described in detail herein further below.

System 100 may include service support tools as described presently. The service support tools provide for repairing application license entitlement configuration issues, and for configuring service support options. In general, the service support tools may be executed on a network machine, such as a node, in the same network as system 100. From this networked machine, the service support tools may be used to perform the following tasks for client 104: debug, manage security, turn on or off email alerts for debug errors, generate a software application inventory, generate license manager reports, look up accountant files, and pull token records. Further, from the networked machine, the service support tools may be used to perform the following tasks for server 102: debug, check in or out a license for a usage of a software application, start or stop a chargecode timer, create or delete tokens, and retrieve data regarding any managed, software application, any user, any site, and any node. In addition, service notification and warning messages can inform the user of upcoming updates and outages.

The service support tools provide an ability to turn on and off debug and trace diagnostics and record these in a debug log file. This log file can then be delivered to application experts for analysis. The debug ability of the service support tools is superior to prior art techniques that require compiling code with a debugger turned on. Instead, each of client 104, license server 102, director 106, and accountant 108 each have built-in debug systems. Such systems write to a log file each event, routine, variable value, and timestamps. Turning on the log file recordation of the debug service support tool during operation of any of client 104, license server 102, director 106, or accountant 108 causes the creation of a thread that generates a verbose log file.

According to some examples, license server 102, director 106, and accountant 108 may be configured to require a key in order to execute. Such examples thus provide for tamper-resistance and thwart malicious installations. According to such examples, a system component, e.g., one of license server 102, director 106, and accountant 108, checks for the presence of a license key in a local configuration file, and does not execute if the key is not present. Each system component has an associated media access control (MAC) address. Further, each system component has an associated system identifier. The key for a given system component may be formed as a cryptographic hash of a concatenation of: the MAC address for the system component, the system identifier for the system component, and a random number.

Figure 2:
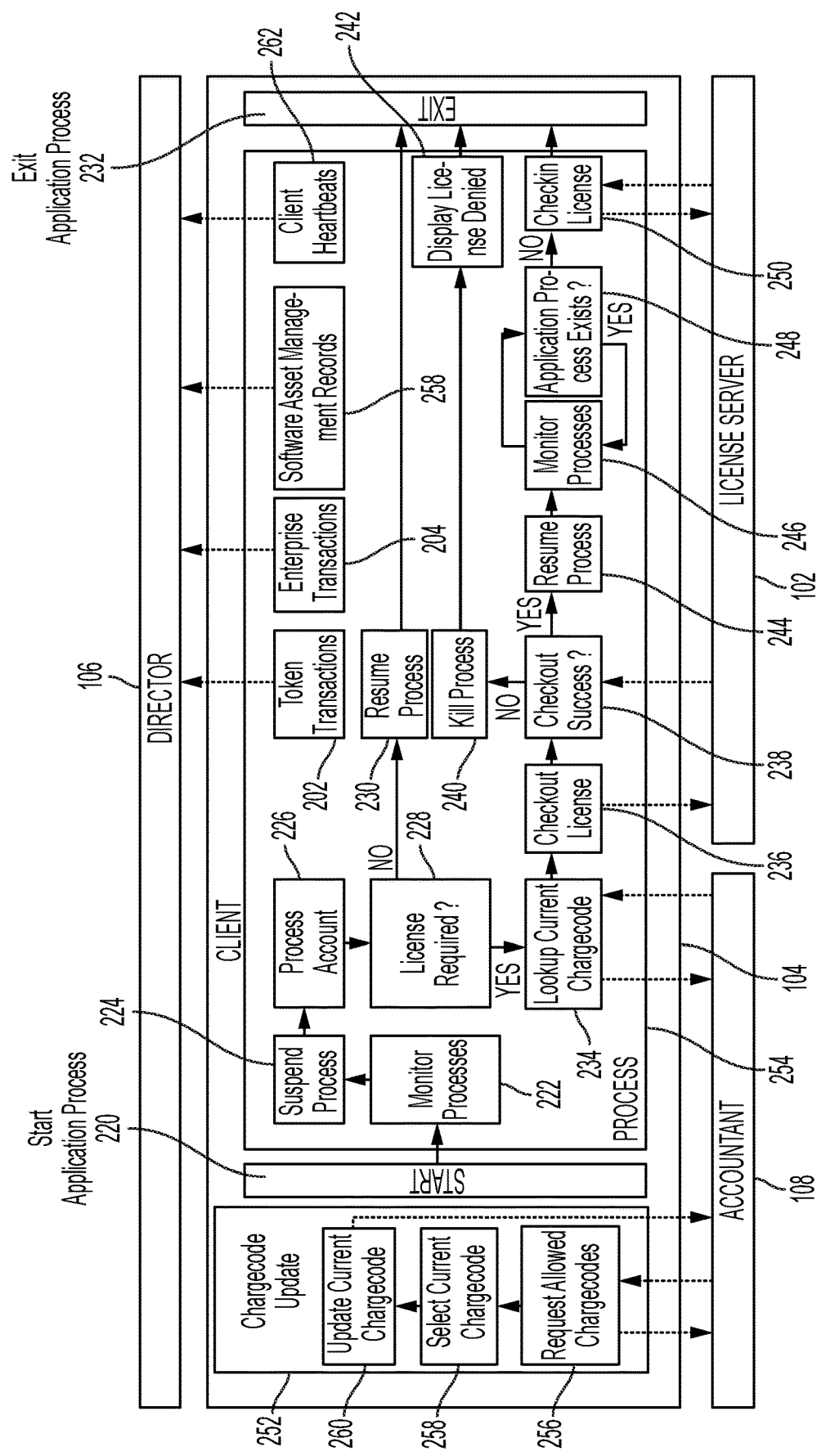
FIG. 2 is a schematic diagram of a client in a system for managing software licenses according to some examples.

FIG. 2 is a schematic diagram of a client 104 in a system for managing software licenses according to some examples. FIG. 2 also depicts director 106, accountant 108, and license server 102 and their communicative couplings. Client 104 electronically stores ordered lists of servers 102, directors 106, and accountants 108 with which it may communicate. If a respective server 102 (or director 106, or accountant 108) is down, client 104 may attempt communication with the next server 102 (or director 106, or accountant 108) on its lists.

In order to manage a software application, some examples establish software asset management records 259. Such records may be formed and sent by client 104 to director 106, e.g., when the software application is installed, upgraded, or removed on client 104. In particular, some examples include a software application installer that installs and uninstalls software applications on clients such as client 104. When it installs or updates a new software application, the software application installer forms and sends a message to director 106 that indicates the software application, the user, the node at which the software application is installed, and the location of the node at which the software application is installed. This information is formed in software asset management records 258 and sent to director 106. Further, when installing a new software application, the software application installer configures the software application such that its initiation can be intercepted while licensing requirements are checked as disclosed in detail herein. Note that the use of the software application installer as described is superior to prior art techniques that rely on network scans to identify managed software, at least because such network scans are resource intensive and slow, e.g., on the order of months.

According to some examples, there are three distinct categories of software license entitlements that may be defined by a software license agreement, particularly its relevant terms and conditions. A first category is token-based software license entitlements, a second category is enterprise-based software license entitlements, and a third category is server-based software license entitlements. These categories are described in detail presently.

Token-based software license entitlements involve data located on individual clients 104, and do not require involvement by license server 102 at the time the respective software is used. Token-based software license entitlements may be used, for example, to permit a client to execute software when client 104 is not communicatively coupled to any license server 102. Thus, token-based software license entitlements may be used when client 104 is expected to be offline for a length of time. When client 104 attempts to execute a managed software application, it first checks whether a local token is available. If so, then the token is used instead of requesting a license from server 102. Token-based software license entitlements may therefore bypass requesting, by client 104 and from license server 102, a license for a usage of the software application, if client 104 has an appropriate token. For token-based software license entitlements, license for usage request transaction information is captured by client 104, and later transferred to director 106 when communication between such computing devices is available. Such token-based software license entitlement interactions between client 104 and license server 102 are represented in FIG. 2 by block 202.

Enterprise-based software license entitlements involve enterprise licenses, where an entire enterprise may simultaneously utilize as many copies of a give software application as they wish. For enterprise-based software license entitlements, client 104 may request an enterprise license for usage of a software application from license server 102. If successful, then the enterprise license for the usage is checked out from server 102, and application license transactions (e.g. enterprise transactions), represented by block 204, are captured on license server 102. If the request for the enterprise license for the usage of the software application is unsuccessful for any reason (e.g., license server 102 license denial, license server 102 not online or otherwise available, etc.), then the software application is permitted to execute anyway, and the relevant application license transactions 204 are captured on client 104, and later transferred to director 106. Because enterprise-based software license entitlements generally permit unlimited instances of the managed software application executing simultaneously, the presence of enterprise-based software license entitlements is generally checked after checking for token-based license entitlements and before checking for server-based software license entitlements.

Token-based software license entitlements and enterprise-based software license entitlements, described above, do not utilize communications between client 104 and license server 102 at the time of the usage of the respective software application. By contrast, server-based software license entitlements, described below, generally utilize communications between client 104 and license server 102 at the time of the usage of the respective software application.

Server-based software license entitlements involve interactions between client 104 and server 102. In reference to FIG. 2, a description of a process 254 for client 104 to acquire a license for a usage of a software application from license server 102, from the perspective of client 104, follows.

At 220, a user at client 104 initiates (e.g. starts) an instance of a software application that is managed by an example. The user may do so using standard application initiation techniques, such as clicking on an icon. The process is transparent from the perspective of the user.

At 222, an executing instance of client software for an example monitors the execution processes of client 104. In doing so, it determines that a new instance of a monitored software application has been invoked. Accordingly, at 224, the client software suspends the execution process of the monitored software application.

At 226, the executing client software locates an account for the software application, and at 228, it checks the account to determine whether a license for the requested usage of the software application is required. As part of 226, client 104 may first check whether a token-based software license entitlement is present, then check whether an enterprise-based software entitlement license present, and then check whether a server-based software license entitlement is present. If no license is required, then control passes to block 230, where the software application process is permitted to resume execution, until, at 232, the user exits the software application and the process 254 of client 104 acquiring a license for a usage of a software application from license server 102 concludes. Otherwise, if a server-based software license entitlement for the requested usage of the software application is required, then control passes to block 234.

At block 234, the executing client software contacts accountant 108 to determine whether the software usage is to be associated with a chargecode. To do so, client 104 contacts accountant 108 with a request for accountant 108 to indicate (e.g. to lookup) a chargecode that is currently in use for the particular software application.

In general, accountant 108 maintains an electronically stored record of the current chargecode that has been previously selected by the user. Further, accountant 108 maintains, for each user, a list of allowed chargecodes. Accountant 108 may obtain and update such a list by using an active directory feature of the client operating system, for example. Accountant 108 also maintains a record of a current chargecode for each managed user.

To maintain a record of the current chargecode for the user of client 104, accountant 108 may interact with client 104 in a chargecode update process 252 as follows. Per block 256, client 104 may request from accountant 108 its list of permitted (e.g. allowed) chargecodes for the managed software user at issue. Client 104 receives the list, and generates a dialogue (e.g., a pop-up box) to display to the user of client 104. Per block 258, the dialogue allows the user to select, or change, a current chargecode for the requested user. Per block 260, once the user enters (e.g. updates) the current chargecode information, chargecode update process 252 of client 104 provides the information to accountant 108. Note that chargecode update process 252 may be performed at any time, not limited to during process 254 by which client 104 acquires a license for the usage of the software application from license server 102. According to some examples, a user of client 104 may initiate chargecode update process 252, e.g., by clicking on a button, at any time.

Thus, per block 234, if a chargecode is currently in use for the managed software application and user of client 104, then accountant 108 replies with the current chargecode.

At block 236, client 104 determines that the software application is subject to a plurality of software license entitlement criteria defined by at least one software license agreement and requests (e.g. requests to checkout) a license for a usage of the software application from license server 102. The request may include an identification of the software application, an identification of the user, an identification of the node, an identification of the chargecode, an identification of the domain, an identification of the pool, an identification of the site, for example. The request may be sent using any of a variety of protocols, such as TCP, HTTP, or XML. License server 102 performs a process for determining whether to provide client 104 with the requested license for usage of the software application as set forth in reference to FIG. 3, below.

At block 238, client 104 determines whether the license checkout request was successful and license server 102 has provided a license for the usage. If not, then control passes to block 240, where client 104 kills the execution process of the software application, and then to block 242, where client 104 display an error message to the user, indicating that the license checkout request was denied. After block 242, control passes to block 232, where and the process 254 of client 104 acquiring a license for a usage of a software application from license server 102 concludes.

If, at block 238, client 104 determines that the request was successful and has provided a license for usage of the software application, then control passes to block 244, where client 104 permits the execution process of the software application to resume normally. During the execution of the managed software application, client 104 continuously monitors the execution of the managed software application at block 246, checking whether the execution is still active (e.g. the application process exists) at block 248. If the software application is still active, then control passes back to block 246, and the monitoring repeats. If the software application is no longer executing, then control passes to license checkin 250.

At license checkin 250 (alternatively check-in), client 104 sends a message to license server 102, requesting that the license for the usage of the managed software application be checked back in. Once the license is checked back in, license server 102 sends a confirmation message back to client 104. Subsequently, at block 232, the process 254 by which client 104 acquires a license for the usage of the software application from license server 102 ends.

Client 104 also includes client heartbeats block 262. In general, every fixed interval (e.g., daily, every four hours, every hour, every 30 minutes, etc.), client heartbeats block 262 sends a simple "ping" message to director 106. The ping message includes an identification of the client. Director 106 updates the time of the latest ping message for each client such as client 104.

Figure 3:
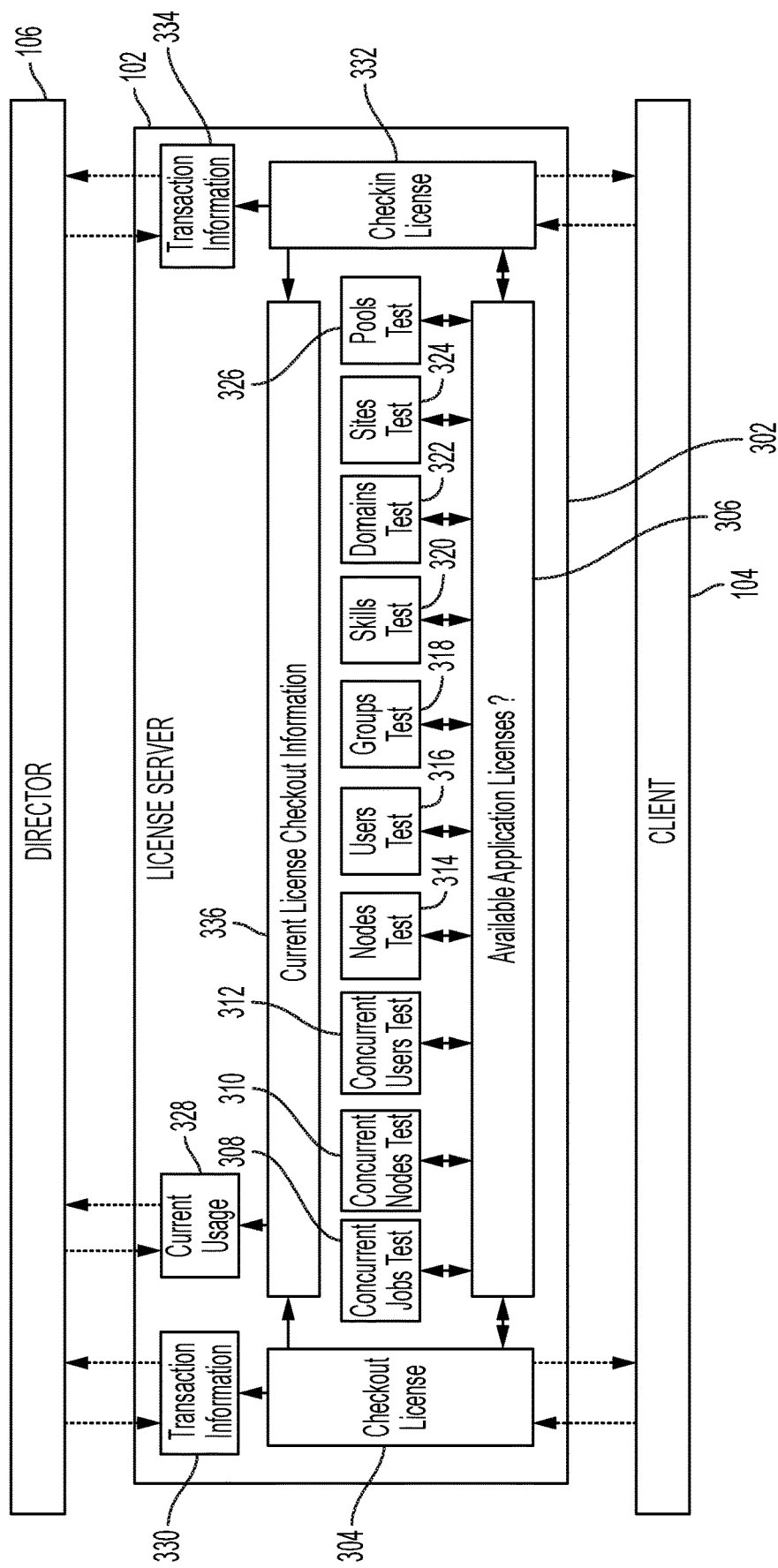
FIG. 3 is a schematic diagram of a license server according to some examples.

FIG. 3 is a schematic diagram of a license server 102 in a system for managing software licenses according to some examples. FIG. 3 also depicts client 104 and director 106, as well as their communicative couplings. A description of a process 302 for license server 102 providing client 104 with a license for a usage of a software application, from the perspective of license server 102, follows.

At block 304, process 302 commences when license server 102 receives a checkout license request for a usage of a software application from client 104. The request may include a request number, an identification of the software application, an identification of the user, an identification of the node, an identification of the site, an identification of the domain, an identification of the pool, and an identification of the chargecode at which the software application is to be used, and a current time, for example. The request may be received according to any of a variety of protocols, such as TCP, HTTP, or XML.

At block 306, license server 102 initiates a plurality of license entitlement criteria tests (e.g. available application licenses), including concurrent jobs test 308, concurrent nodes test 310, concurrent users test 312, list of nodes test 314, list of users test 316, list of groups test 318, list of skills test 320, list of domains test 322, list of sites test 324, and list of pools test 326. Each test 308, 310, 312, 314, 316, 318, 320, 322, 324, 326 corresponds to one or more license entitlement criteria, which may be defined by the terms and conditions of a software license agreement for the software application. In general, the concurrent tests, such as concurrent jobs test 308, concurrent nodes test 310, and concurrent users test 312, check whether the requested usage of the software application would result in exceeding a number of concurrent (e.g., simultaneous) uses of the software application according to some predefined limit indicated by the corresponding software license agreement. In general, the list tests, such as list of nodes test 314, list of user test 316, list of groups test 318, list of skills test 320, list of domains test 322, list of sites test 324, and list of pools test 326, check whether the requested usage of the software application would result in a violation of a specified restriction concerning the named usage parameters. Thus, for example, the list of nodes test determines whether the requested usage would be inconsistent with restrictions on the software application's execution on nodes as specified in the list of nodes test. This test, and others, are described in detail presently. A description of how to use the results from the individual tests 308, 310, 312, 314, 316, 318, 320, 322, 324, 326 to draw a final conclusion as to whether the request of a usage of the software application should be affirmed or denied follows the descriptions of the individual tests 308, 310, 312, 314, 316, 318, 320, 322, 324, 326.

Concurrent jobs test 308 determines whether a set limit on the number of executing instances of the particular software application would be exceeded if the requested usage were permitted. License server 102 stores a copy of this set limit on concurrent application jobs and compares it to a running tally of executing instances of the software application as obtained by current usage block 328. If the tally is greater than or equal to the limit, then this test fails.

Concurrent nodes test 310 determines whether a set limit on the number of nodes executing the particular software application would be exceeded if the requested usage were permitted. Here, "nodes" refers to network nodes, e.g., clients such as client 104, as specified by a node name such as A1234567.nw.nos.boeing.com. License server 102 stores a copy of the set limit on the number of nodes that may concurrently execute a copy of the software application and compares it to a running tally of executing instances of the software application on different nodes as obtained by current usage block 328. If the tally is greater than or equal to the limit, then this test fails.

Concurrent users test 312 determines whether a set limit on the number of users using the particular software application would be exceeded if the requested usage were permitted. License server 102 stores a copy of this set limit on concurrent application users. Note that generally, nodes may correspond to users, but not necessarily. For example, a single user may be logged in to, and use multiple instances of the software application, on multiple nodes. Likewise, a single node, such as a supercomputer, may have multiple users logged in and using software applications. License server 102 stores a copy of the set limit on concurrent users and compares it to a running tally of executing instances of the software application by different users as obtained by current usage block 328. If the tally is greater than or equal to the limit, then this test fails.

List of nodes test 314 determines whether the requested usage of the software application would violate conditions specified by one or more lists of nodes, e.g., clients such as client 104. Such lists of nodes are stored by license server 102.

According to some examples, each list of nodes test 314 involves two lists of nodes, referred to herein as the "accept node list" and the "reject node list". These node lists are formatted to provide information as to, respectively, which nodes are permitted to execute an instance of the software application, and which nodes are forbidden from executing an instance of the software application. For example, each node list may be a computer-readable text (e.g., dot txt) document that includes a list of nodes, specified by name such as A1234567.nw.nos.boeing.com. The node lists may include subscription end dates in association with one or more node names, e.g., next to the node names. Further, either list of nodes may include a wildcard character, such as an asterisk. The presence of wildcard character in the node accept list, regardless as to whether any nodes are listed explicitly, indicates that all nodes are permitted to execute an instance of the software application. The presence of a wildcard character in the node reject list, regardless as to whether any nodes are listed explicitly, indicates that no nodes are permitted to execute an instance of the software application.

To evaluate list of nodes test 314 using an accept node list and a reject node list as described above, the following algorithm may be performed according to some examples. License server 102 identifies the requesting node, from which the request for a license for a usage of the software application originated. License server may consult data in the request itself for this information. License server 102 then checks the requesting node against the reject node list. If the requesting node is explicitly listed in the reject node list, then it fails list of nodes test 314. List of nodes test 314 outputs a negative response, e.g., a binary "0", and concludes. Otherwise, proceed to check whether the requesting node is explicitly listed in the accept node list. If the requesting node is explicitly listed in the accept node list, then it passes list of nodes test 314. List of nodes test 314 outputs an affirmative response, e.g., a binary "1", and concludes. Otherwise, proceed to check whether the reject node list includes a wildcard character. If the reject node list includes a wildcard character, then the requesting node fails list of nodes test 314. List of nodes test 314 outputs a negative response and concludes. Otherwise, proceed to check whether the accept node list includes a wildcard character. If the accept node list includes a wildcard character, then the requesting node passes list of nodes test 314. List of nodes test 314 outputs a positive response and concludes. Otherwise, the requesting node fails list of nodes test 314. List of nodes test 314 outputs a negative response and concludes.

The above algorithm for evaluating the list of nodes test using an accept node list and a reject node list may be generalized to evaluate any of the list tests 314, 316, 318, 320, 322, 324, 326 based on a parameter concerning the request and using an accept list and a reject list. A general parameter test algorithm appears below.

| Parameter Test Algorithm |
|---|
| (1) Identify parameter to be tested. Proceed to (2). |
| (2) Check the parameter against the reject list.<br>If the parameter is explicitly listed in the reject list, then output "0" and halt. Otherwise, proceed to (3). |
| (3) Check the parameter against the accept list.<br>If the parameter is explicitly listed in the accept list, then output "1" and halt. Otherwise proceed to (4). |
| (4) Check whether the reject list includes a wildcard character.<br>If the reject list includes a wildcard character, then output "0" and halt. Otherwise, proceed to (5). |
| (5) Check whether the accept list includes a wildcard character.<br>If the accept list includes a wildcard character, then output a "1" and halt. Otherwise, output a "0" and halt. |

As described in detail below, the above disclosed parameter test algorithm may be used to evaluate users test 316 based on a user parameter, evaluate groups test 318 based on a group parameter, evaluate skills test 320 based on a skills parameter, evaluate domains test 322 based on a domain parameter, evaluate sites test 324 based in a site parameter, and evaluate pools test 326 based on a pool parameter.

Note that the use of two lists for list of nodes test 314, and for the general parameter test algorithm, is for purposes of illustration rather than limitation. Examples may utilize a single list, or more than two lists.

List of users test 316 determines whether the requested usage of the software application would violate conditions specified by one or more lists of users. Such lists of users are stored by license server 102. To evaluate list of users test 316 for a particular request for usage of a software application, the user is identified per (1) of the parameter test algorithm. The user's identification may be retrieved from the request, for example. The remaining steps (2)-(5) are then applied, as needed, using an accept user list and a reject user list.

List of groups test 318 determines whether the requested usage of the software application would violate conditions specified by one or more lists of groups. Here, a group may be a group within a commercial organization such as a corporation. A group may be defined as a portion of a commercial organization's org chart. Example groups include executive, engineering, legal, administrative, maintenance, etc. An accept group list and a reject group list may be stored by license server 102. To evaluate list of groups test 318 for a particular request for usage of a software application, the parameter test algorithm may be applied with the parameter "group". To do so, the group is identified per line (1) of the parameter test algorithm. The group's identification may be retrieved from the request, for example. Alternately, license server 102 may look up the group's identification from a stored look-up table that associates the user identified in the request with the user's group, for example. The remaining steps (2)-(5) of the parameter test algorithm are then applied, halting where indicated, using the accept group list and the reject group list. The output of list of groups test 318 is one of affirmative or negative, e.g., "1" or "0".

List of skills test 320 determines whether the requested usage of the software application would violate conditions specified by one or more lists of skills. Here, a skill may be an official certification, a degree of education, a delegation, or an appointment, for example. A particular type of skill is a named role in a business entity, e.g., network engineer, human resource specialist, data analyst, etc. Further example skills include engineering certifications, such as vendor-supplied engineering certifications, etc. An accept skills list and a reject skills list may be stored by license server 102. To evaluate list of skills test 320 for a particular request for usage of a software application, the parameter test algorithm may be applied with the parameter "skill". To do so, the skill is identified per line (1) of the parameter test algorithm. The skill may be retrieved from the request, for example. Alternately, license server 102 may look up the skill from a stored look-up table that associates the user identified in the request with the user's skill(s), for example. The remaining steps (2)-(5) of the parameter test algorithm are then applied, halting where indicated, using the accept skills list and the reject skills list. The output of list of skills test 320 is one of affirmative or negative, e.g., "1" or "0".

List of domains test 322 determines whether the requested usage of the software application would violate conditions specified by one or more lists of domains. Here, a domain may be a geographic region or a network domain. Example domains include Eastern USA, Western USA, European Union, Australia, Asia, etc. An accept domains list and a reject domains list may be stored by license server 102. To evaluate list of domains test 322 for a particular request for usage of a software application, the parameter test algorithm may be applied with the parameter "domain". To do so, the domain is identified per line (1) of the parameter test algorithm. The domain may be retrieved from the request, for example. Alternately, license server 102 may look up the domain from a stored look-up table that associates the node identified in the request with the respective domain in which it is located, for example. The remaining steps (2)-(5) of the parameter test algorithm are then applied, halting where indicated, using the accept domains list and the reject domains list. The output of list of domains test 322 is one of affirmative or negative, e.g., "1" or "0".

List of sites test 324 determines whether the requested usage of the software application would violate conditions specified by one or more lists of sites. Here, a site may be a physical commercial site. Example sites include corporate campuses, university campuses, engineering facilities, office buildings, cities, etc. An accept sites list and a reject sites list may be stored by license server 102. To evaluate list of sites test 324 for a particular request for usage of a software application, the parameter test algorithm may be applied with the parameter "site". To do so, the site is identified per line (1) of the parameter test algorithm. The site may be retrieved from the request, for example. Alternately, license server 102 may look up the site from a stored look-up table that associates the node identified in the request with the respective site at which it is located, for example. The remaining steps (2)-(5) of the parameter test algorithm are then applied, halting where indicated, using the accept sites list and the reject sites list. The output of list of sites test 324 is one of affirmative or negative, e.g., "1" or "0".

List of pools test 326 determines whether the requested usage of the software application would violate conditions specified by one or more lists of pools. Here, a pool may be a division of a corporate work force. Example pools include domestic employees, international employees, contractors, etc. An accept pools list and a reject pools list may be stored by license server 102. To evaluate list of pools test 326 for a particular request for usage of a software application, the parameter test algorithm may be applied with the parameter "pool". To do so, the pool is identified per line (1) of the parameter test algorithm. The pool may be retrieved from the request, for example. Alternately, license server 102 may look up the pool from a stored look-up table that associates the user identified in the request with the respective pool in which the user is classified, for example. The remaining steps (2)-(5) of the parameter test algorithm are then applied, halting where indicated, using the accept pools list and the reject pools list. The output of list of pools test 326 is one of affirmative or negative, e.g., "1" or "0".

Note that each of the license entitlement tests (blocks 308, 310, 312, 314, 316, 318, 320, 322, 324, 326) output either affirmative (e.g., "1") or negative (e.g., "0"). If the software license agreement for a given software application lacks restrictions with respect to any software entitlement test(s), then such test(s) may output a "1" in such a situation. Thus, the outputs of the license entitlement tests may be concatenated in a succinct, ordered, ten-binary-digit string. For example, if a given request passes concurrent jobs test 308 and list of nodes test 314, the succinct string may be formed as, for example, 1001000000.

Once all of the license entitlement criteria tests (blocks 308, 310, 312, 314, 316, 318, 320, 322, 324, 326) initiated per block 306 are performed, license server 102 determines whether a license for the requested usage is available. To do so, license server may utilize the succinct string described above, may consider the test outputs directly, or may consider the test outputs in a different format. Block 306 thus receives the outputs from the tests, and license server 102 compares the test results to a stored set of license entitlement criteria for the software application.

Based on the comparison, license server 102 determines whether all 10 license tests have been meet to provide a license for the requested usage of the software application. License checkout block 304 receives the results of this determination. If the determination reveals that all tests were passed, e.g., the determination is equal to 1111111111, then license server 102 checks out and provides a license for the requested usage to client 104. Otherwise, license server sends a report to client 104, detailing exactly which tests 308, 310, 312, 314, 316, 318, 320, 322, 324, 326 passed and exactly which tests 308, 310, 312, 314, 316, 318, 320, 322, 324, 326 failed. Client 104 may display these results to the user, e.g., in a pop-up box.

License checkout block 304 reports the license checkout to transaction information block 330 for the checkout process. The report to transaction information block 330 for the checkout process may include a variety of transaction information. Any, or any combination, of the following transaction information may be included: record number, application transaction number, transaction type (here, "checkout"), number of available licenses, usage (e.g., number of checked out licensees at the time of the transaction), timestamp, software application identification, user identification, user actual name, node identification, group identification, pool identification, skill identification, domain identification, site identification, chargecode information, license server identification, client identification, identification of the request for usage of the software application, and/or identification of the license for the usage. For requests that failed, the report to transaction information block 330 for the checkout process may include details of all tests that passed and failed. In some examples, this information is included for each transaction, e.g., in the form of the succinct, ordered, ten-binary-digit string discussed above. In either case, transaction information block 330 for the checkout process reports the transaction information to director 106 for persistent storage, e.g., in director 106 or data warehouse 110.

Director 106 may effectuate very fast throughput using disclosed techniques. For example, director 106 may hold incoming transaction information in a first portion of volatile memory until a certain threshold amount of information is received, at which point new incoming information is held in a second portion of volatile memory, the information held in the first portion is transferred to persistent memory, and the process repeated for the second portion of volatile memory. The threshold amount and number of volatile memory portions used may be adjusted based on actual rates of transaction information received. Some examples are expected to record transaction information in director 106 within a 100,000$^{th}$ of a second from when the user requests the respective application's initiation.

License checkout block 304 also reports the license checkout to current license checkout information block 336. Current license checkout information block 336 packages license checkout information and sends it to current usage block 328. Such license checkout information may include any, or any combination, of: record number, application transaction number, transaction type (here, "checkout"), number of available licenses, usage (e.g., number of checked out licensees at the time of the transaction), timestamp, software application identification, user identification, user actual name, node identification, group identification, pool identification, skill identification, domain identification, site identification, chargecode, license server identification, client identification, identification of the request for usage of the software application, and/or identification of the license for the usage. Current usage block 328 reports this information to director 106, which maintains a running record of which applications are currently checked out with a license, as well as related information such as the number of currently executing instances of the application, as well as their respective nodes, users, groups, skills, domains, sites, pools, and satisfied license entitlement criteria.

Once the user is finished with the software application, or the software application is otherwise closed, per license checkin 332, client 104 sends a checkin message to license server 102. Per license checkin 332, license server 102 checks back in the license obtained per the actions of block 304. In addition, license server 102 provides an update to current license checkout information block 336, which updates director 106 via current usage block 328 to account for the checked-in license. Yet further, license server 102 provides updated transaction information to transaction information block 334 for the checkin process, which updates the transaction information stored at director 106 for the particular license checkin event. Such updated information may include a stop time and a duration of usage time, for example.

Some examples include active license checkout monitoring. According to such examples, once client 104 successfully checks out a license for a usage of a software application, it thereafter periodically sends an active license message to license server 102, e.g., every twenty minutes. License server 102 checks for such messages periodically, e.g., hourly. Licenses that have been checked out, but not associated with any active license message for a sufficient period of time, e.g., two hours, may be checked back in automatically. License server 102 may ignore stale active license messages and stale license checkin requests. This functionality can prevent license pool depletion.

Figure 4:
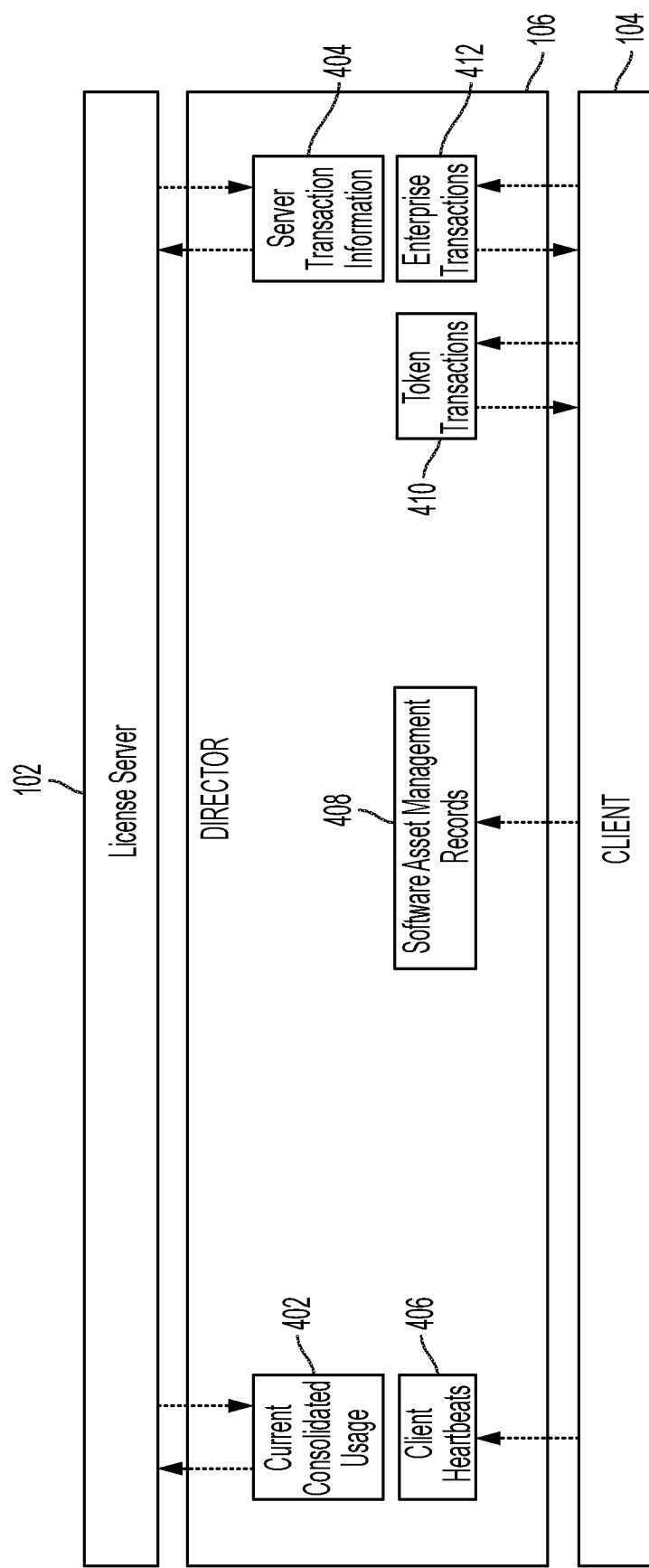
FIG. 4 is a schematic diagram of a director in a system for managing software licenses according to some examples.

FIG. 4 is a schematic diagram of a director 106 in a system for managing software licenses according to some examples. FIG. 4 also depicts client 104 and license server 102, as well as their communicative couplings.

Current consolidated usage block 402 interfaces with license server 102 to receive current usage information per block 328 of FIG. 3, such as license checkout information and license checkin information. Current consolidated usage block 402 consolidates the current usage information received from a plurality of license servers, including license server 102. Current consolidated usage block 402 can provide current usage information for any of the managed software applications upon request.

Server transaction information block 404 interfaces with license server 102 to receive transaction information per block 334 of FIG. 3. Server transaction information block 404 consolidates the transaction information received from a plurality of license servers, including license server 102. Server transaction information block 404 can provide transaction information for any of the managed software applications, any user, any node, etc., upon request.

Client heartbeats block 406 receives client heartbeat ping messages from clients such as client 104. Director 106 updates the time of the latest ping message for each such client. Director 106 may use this information to determine which clients are active and in need of software license management services.

Software asset management records 408 receives software asset management records 259 from clients such as client 104. Such records may indicate the software application, the user, the node at which the software application is installed, and the location of the node at which the software application is installed. This information is stored in software asset management records 258.

Token-based software transaction interaction block 410 (e.g. Token Transactions) of director 106 interfaces with token-based transaction interaction block 202 of client 104 to receive license for usage request transaction information when communication with client 104 is available.

Enterprise-based software transaction interaction block 412 (e.g. Enterprise Transactions) of director 106 interfaces with enterprise-based software transaction interaction block 204 of client 104 to receive license for usage request transaction information when communication with client 104 is available.

Figure 5:
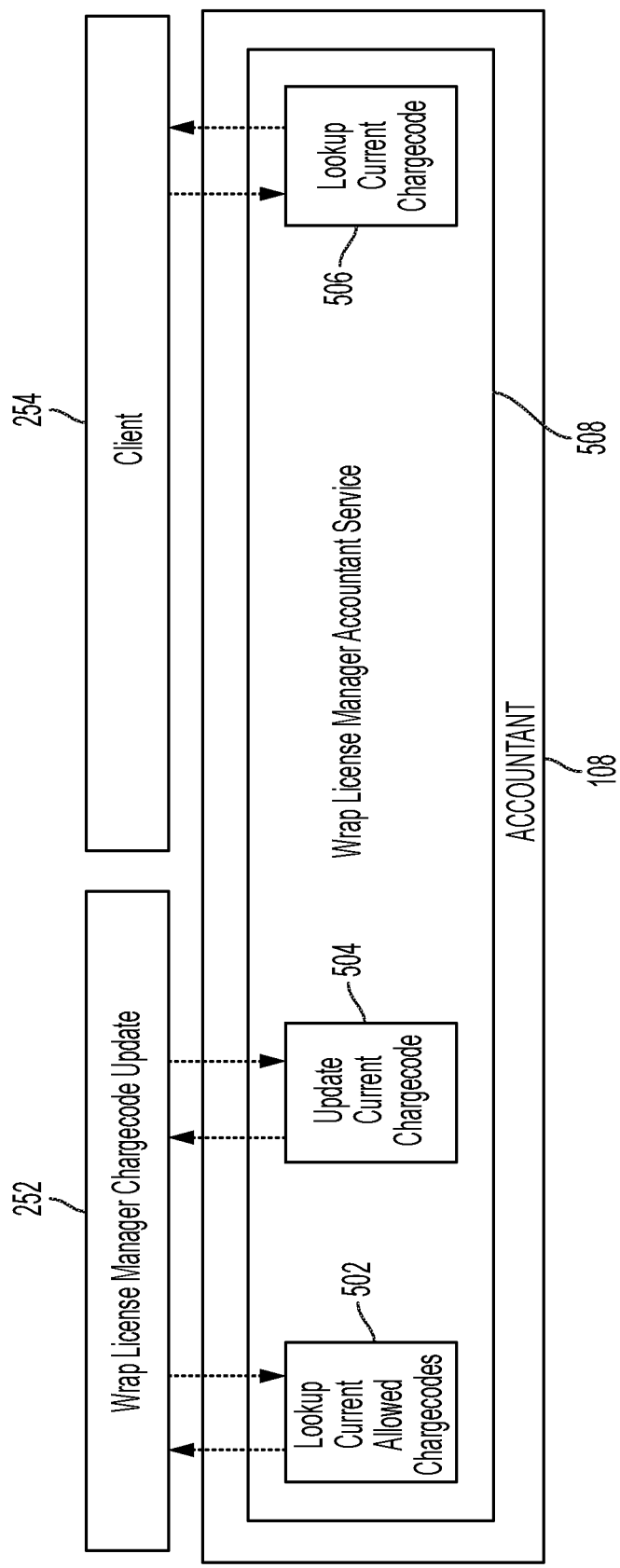
FIG. 5 is a schematic diagram of an accountant in a system for managing software licenses according to some examples.

FIG. 5 is a schematic diagram of an accountant 108 in a system for managing software licenses according to some examples. FIG. 5 also depicts process 254 for client 104 to acquire a license for a usage of a software application from license server 102, and chargecode update process 252, both components of client 104. FIG. 5 also depicts the communicative couplings between accountant 108 and processes 252 and 254.

Chargecode update process 252 of client 104 interacts with lookup current allowed account chargecodes process 502, which is part of license manager accountant service 508 of accountant 108. Such interaction may occur upon client 104 requesting a list of permitted chargecodes for a provided user account from accountant 108 per block 256. In response, lookup current allowed account chargecodes process 502 retrieves the requested information and provides it to chargecode update process 252 of client 104.

Chargecode update process 252 of client 104 also interacts with update current chargecode process 504, which is part of license manager accountant service 508 of accountant 108. Such interaction may occur upon client 104 providing current chargecode information per block 258 and providing an update per block 260.

Process 254 for client 104 to acquire a license for a usage of a software application from license server 102 interacts with lookup current chargecode block 506, which is part of license manager accountant service 508 of accountant 108. Such interaction may occur per block 234, at which client 104 contacts accountant 108 to determine whether the software usage is to be associated with a chargecode.

Figure 6:
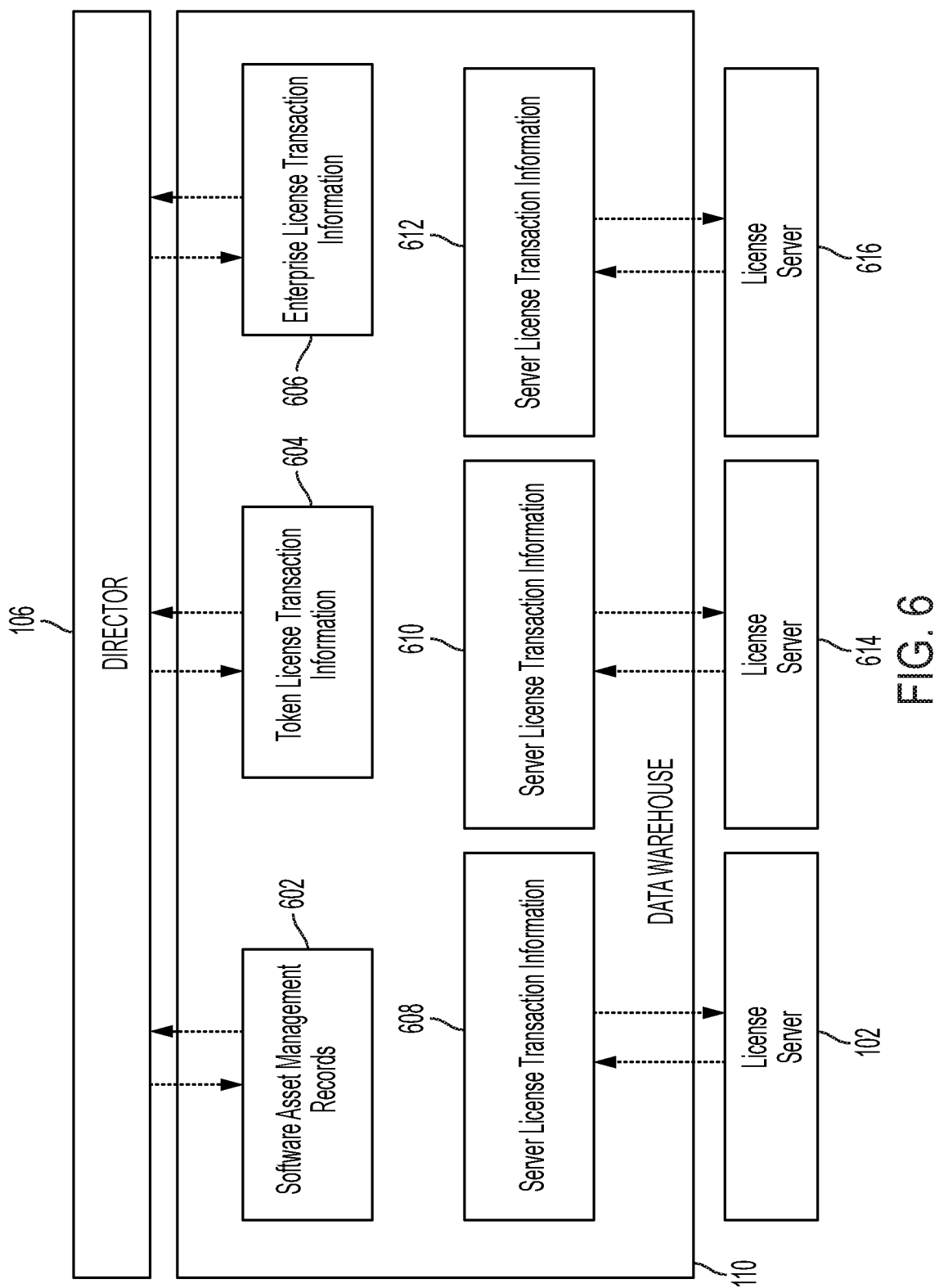
FIG. 6 is a schematic diagram of a data warehouse in a system for managing software licenses according to some examples.

FIG. 6 is a schematic diagram of a data warehouse 110 in a system for managing software licenses according to some examples. FIG. 6 also depicts license servers 102, 614, 616, and director 106, as well as their communicative couplings.

Data warehouse 110 may be implemented as cloud storage, local persistent storage, or as a different type of storage Data warehouse 110 may store data provided by director 106. For example, data warehouse 110 may store software asset management records 602, e.g., as provided to director 106 per 258 of FIG. 2. Also, data warehouse 110 may store token license transaction information 604, e.g., as provided to director 106 per block 202 of FIG. 2. Further, data warehouse 110 may store enterprise license transaction information 606, e.g., as provided to director 106 per block 204 of FIG. 2.

Data warehouse 110 may also store data provided by license server 102 (as well as data from other license servers 614, 616). For example, data warehouse 110 may store transaction information 610 provided by license server 614 per block 330 for the checkout process and updated per block 334 for the checkin process. Data warehouse 110 may further store respective transaction information 610, 612 for a plurality of license servers, such as for license servers 614 and 616.

Data warehouse 110 provides the ability to generate analytic reports (also referred to as "analytics") with specifically filtered data. Specifically, data warehouse 110 stores transaction information, including chargecode information, as described above in reference to FIG. 3. Data warehouse 110 may store such information in a database, for example.

Analytic report generation may be initiated in a variety of ways. Some examples include a report generation application configured to query the chargecode information (and other transaction information) stored in the database of data warehouse 110. A user may use the report generation application to specify filtering criteria, and the application may retrieve the corresponding data. Some examples may be configured to periodically (e.g., daily, monthly, quarterly, yearly) generate one or more analytic reports and publish them, e.g., to a password-protected website. Authorized users may be provided with the password in order to obtain the reports. Other chargecode initiation techniques may be used in addition or in the alternative.

Analytic reports may include chargecode information and other transaction information filtered according to a variety of criteria. A non-exhaustive list of such criteria is presented below.

Named application license usage by hour, day, week, month, quarter, year, and all years (this could be in percent of available license or total count of licenses);

Named application license usage by network domain (for example, this could be displayed for a specific network domain or all network domains, e.g., Northwest, Southwest, Midwest, Northeast, Southeast, . . . );

Named application license usage by physical site (for example, the Bellevue site, the Everett site, the Chicago site, etc.);

Named application license usage by employee type (for example, US employees, international employees, US contractors, international Contractors, country specific employees, country specific contractors, . . . );

Named application license usage by employee name (for example, Jane Smith, John Doe, etc.);

Named application license usage by organization group (for example, flight test, engineering, customer service, accounting, human resources, etc.);

Named application license usage by skill classification (for example, software engineers, business management, finance, configuration management, flight test, etc.);

Named application license usage by business unit (for example, product development, product test, product verification and validation, product test, product maintenance, product support, . . . );

Named application license usage by chargecode (for example, FLT_TST_01, ENG_EVAL_02, etc.);

Named application license usage by computer (for example, Computer_00001, Computer, 00002, etc.);

Named application license usage by user account name (for example, astrx_01, detjk_45, etc. A single user could have multiple computer accounts, so this does not necessarily correspond to employee name);

Named application peak license usage for a given time period;

Named application license denials by hour, day, week, month, quarter, year, and all years (this could be in percent of available license or total count of licenses);

Named application license denials by network domain (for example, this could be displayed for a specific network domain or all network domains, e.g. Northwest, Southwest, Midwest, Northeast, Southeast, . . . );

Named application license denials by physical site (for example, the Bellevue site, the Everett site, the Chicago site, etc.);

Named application license denials by employee type (for example, US employees, international employees, US contractors, international Contractors, country specific employees, country specific contractors, . . . );

Named application license denials by employee name (for example, John Smith, Bob Turner, etc.);

Named application license denials by organization group (for example, flight test, engineering, customer service, accounting, human resources, etc.);

Named application license denials by skill classification (for example, software engineers, business management, finance, configuration management, flight test, etc.);

Named application license denials by business unit (for example, product development, product test, product verification and validation, product test, product maintenance, product support, . . . );

Named application license denials by chargecode (for example, FLT_TST_01, ENG_EVAL_02, etc.);

Named application license denials by compute (for example, Computer_00001, Computer, 00002, etc.);

Named application license denials by user account name (for example, astrx_01, detjk_45, etc.: A single user could have multiple computer accounts, so this one is different than employee name);

Named application license denials for a given time period;

List of top named application users (for example, Jane Smith, John Doe, etc.);

List of top named application computers (for example, Computer 9876, Computer 3485, etc.);

List of top named application groups (for example, structures, computing, etc.);

List of top named application sites (for example, Philadelphia site, London site, etc.);

Named chargecode units summary by business unit, organization, employee classification;

List of computers which have the application installed, but are not using it;

List of users which have the application installed, but are not using it; and

List of users average license usage.

The usage reports may include charts that track trends, such as graphs of a named application's usage each day for a month. Any data filtered by one or more of the above criteria may be tracked, and graphed, over any span of time, e.g., daily for a week, month, or year; monthly for a year, hourly for a day, etc.

Figure 7:
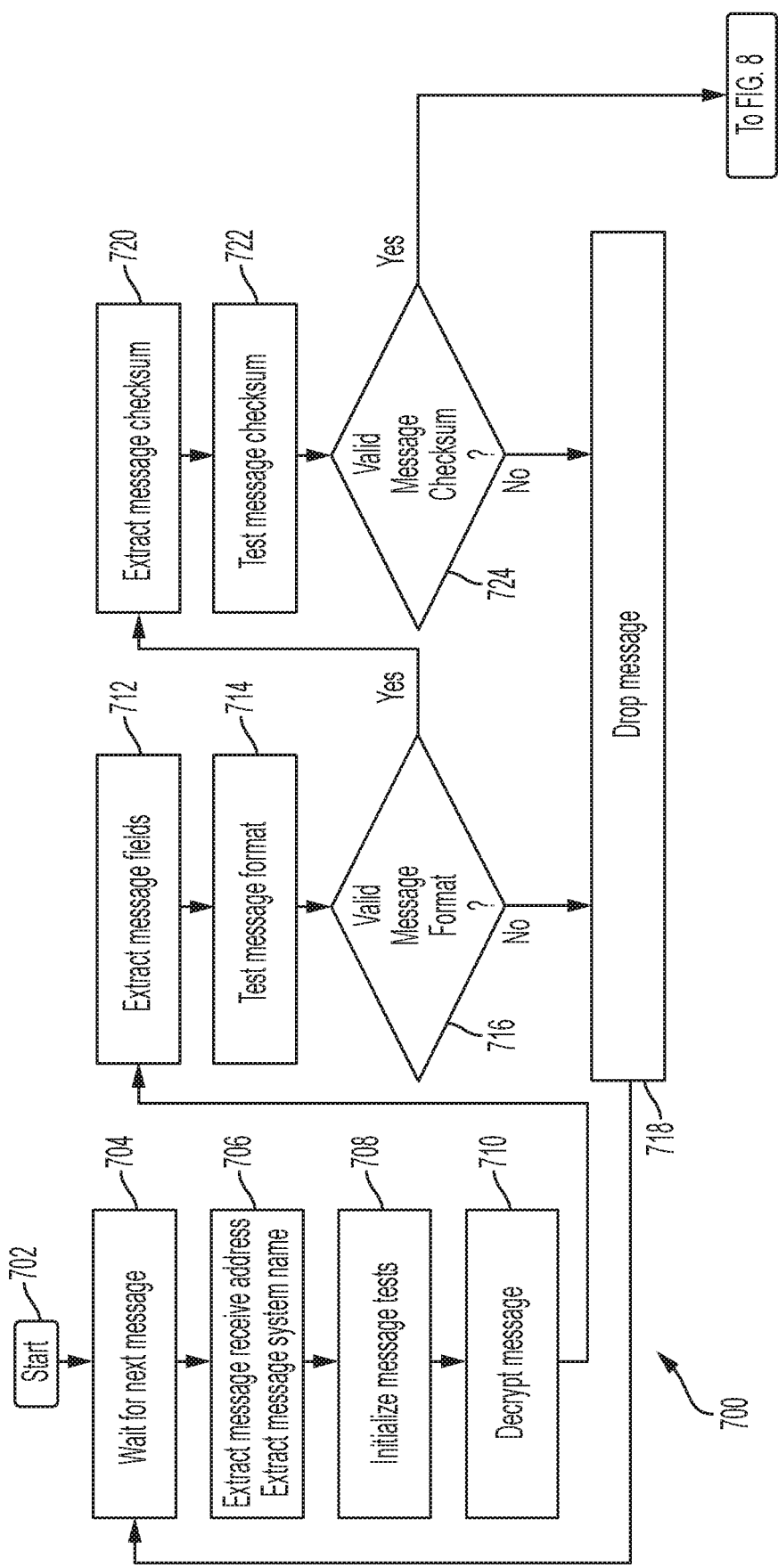
FIG. 7 is a flow diagram of a portion of a method for processing a message in a system for managing software licenses according to some examples.
Figure 8:
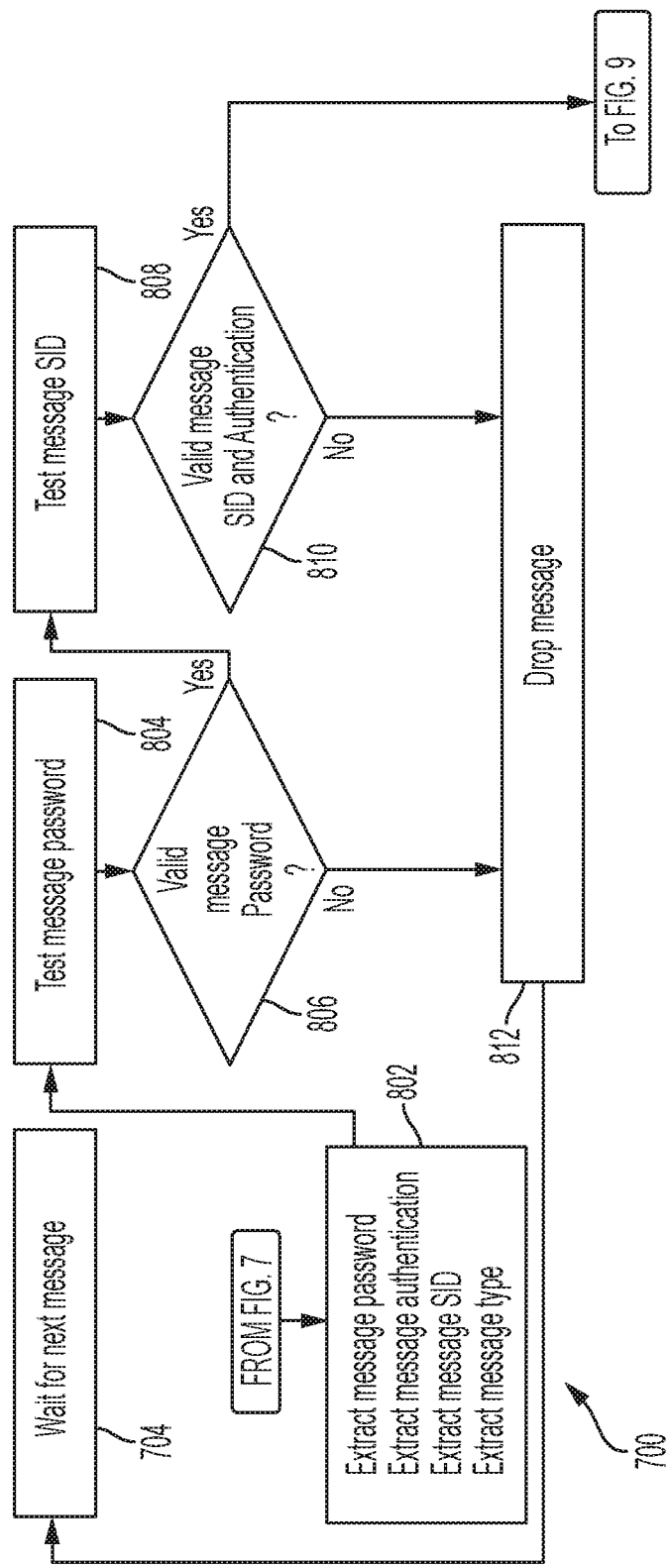
FIG. 8 continues the flow diagram of FIG. 7.
Figure 9:
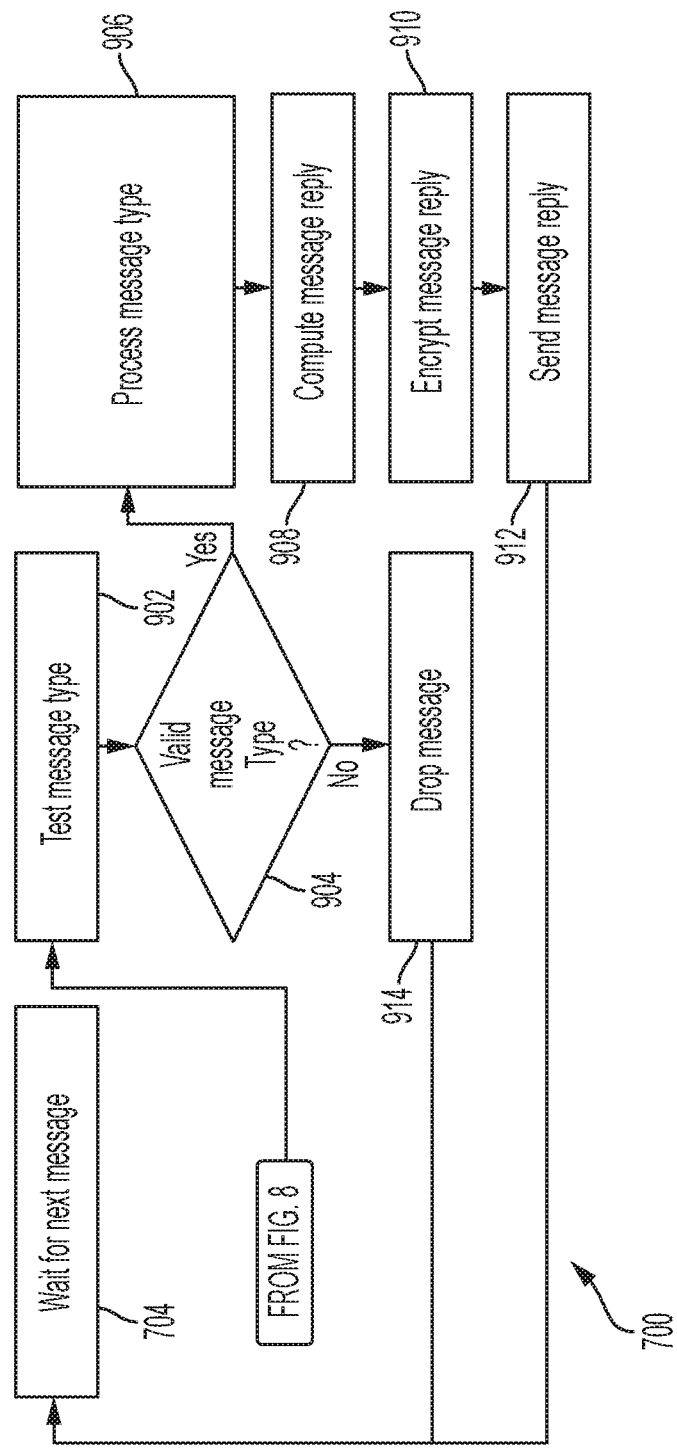
FIG. 9 concludes the flow diagram of FIGS. 7 and 8.

FIGS. 7, 8, and 9 depict a flow diagram for a method 700 for processing a message in a system for managing software licenses according to some examples. Method 700 may be practiced by any of license server 102, client 104, director 106, and/or accountant 108. In particular, method 700 may be implemented to receive and process any message, as described herein, sent between any of license server 102, client 104, director 106, and/or accountant 108. Thus, method 700 is described as being performed by a "system component", which may be any of license server 102, client 104, director 106, or accountant 108.

In general, messages sent between any of license server 102, client 104, director 106, and accountant 108 may have a specified message format. Each message may include a plurality of fields with designated meanings. For example, such messages may have fields for any, or any combination, of: message header, message password, message authentication, message system identifier, message type, message payload, message status, and message checksum. These fields, and their contents, are described in reference to method 700 below.

Method 700 may commence at 702. At 704, the system component waits to receive a next message.

At 706, the system component receives a message from another system component. The receiving system component extracts data from the header field of the received message. In particular, the receiving system component extracts a message receive address corresponding to the sending message component and a message system name corresponding to the system of the sending system component.

At 708, the system component initializes message tests, and at 710, the system component decrypts the message.

At 712, the system component parses and extracts the message fields, and at 714, the system component tests the message format, e.g., by determining whether the expected message fields are present. If not, then per 716, the message is dropped at 718 and control reverts to 704 where the system component waits for the next message. If the message has a valid format, then per 716, control passes to 720.

At 720, the system component extracts the message checksum from the message checksum field. The message checksum may be a hash, e.g., a cryptographic hash, of the remainder of the message, or of any particular field or fields, such as the message payload. At 722, the system component tests the message checksum, e.g., by re-computing the hash and comparing it to the message checksum provided in the message checksum field. If the message checksum is valid, then per 724, control passes to 802 of FIG. 8. Otherwise, the message is dropped at 718, and control reverts to 704, where the system component waits for the next message.

At 802, the system component extracts the message password from the message password field, the message authentication from the message authentication field, the message system identifier (SID) from the message system identifier field, and the message type from the message type field.

At 804, the system component tests the message password. The message password may be one or more random numbers periodically (e.g., every five minutes) generated by a system component such as license server 102. According to some examples, each such random number is associated with a time period within which it was generated. Each message may include three such random numbers, namely, a random number corresponding to the time period in which the message was sent, a random number corresponding to the time period immediately before the time period in which the message was sent, and a random number corresponding to the time period immediately after the time period in which the message was sent. If any of the passwords are identical to the password for the time period in which the message was received, or for the time periods just prior to and just after the time period in which the message was received, then, per 806, control passes to 808. Otherwise, the message is dropped at 812, and control reverts to 704, where the system component waits for the next message.

At 808, the system component tests the message system identifier (SID). The message system identifier may be a unique datum associated with the system 100 for managing software licenses. Also per 808, the system component may test the message authentication. The message authentication may be a digitally signed datum, such as a digitally signed cryptographic hash of the message. A trusted party, such as license server 102, may provide the digital signature using a private key of an asymmetric cryptographic scheme. The signature may be validated by applying a corresponding public key of the asymmetric cryptographic scheme and determining if the result is as expected, e.g., a cryptographic hash of the message. The message authentication may be omitted, except, for example, if the message requests privileged actions. If the message system identifier matches the unique datum associated with the system, and if the message authentication is properly validated, then, per 810, control passes to 902. Otherwise, if either test fails, the message is dropped at 812, and control reverts to 704, where the system component waits for the next message.

At 902, the system component tests the message type. The message type may be any of a variety of indications as to the message's purpose. For example, message types may be checkin, checkout, etc. If the message type is properly formed and an allowed message type (e.g. the message type is valid), then, per 904, control passes to 906. Otherwise, the message is dropped at 914, and control reverts to 704, where the system component waits for the next message.

At 906, the system component processes the message according to the specified message type. Details of such processing are shown and described herein in reference to FIGS. 1-6. Such processing computes the message reply at 908, which is encrypted at 910, and sent to the appropriate system component (which may differ from the system component that sent the message) at 912. Subsequently, control reverts to 704, where the system component waits for the next message. Note that the message status field may be used in return messages to indicate whether the initial message was successfully or unsuccessfully received.

Figure 10:
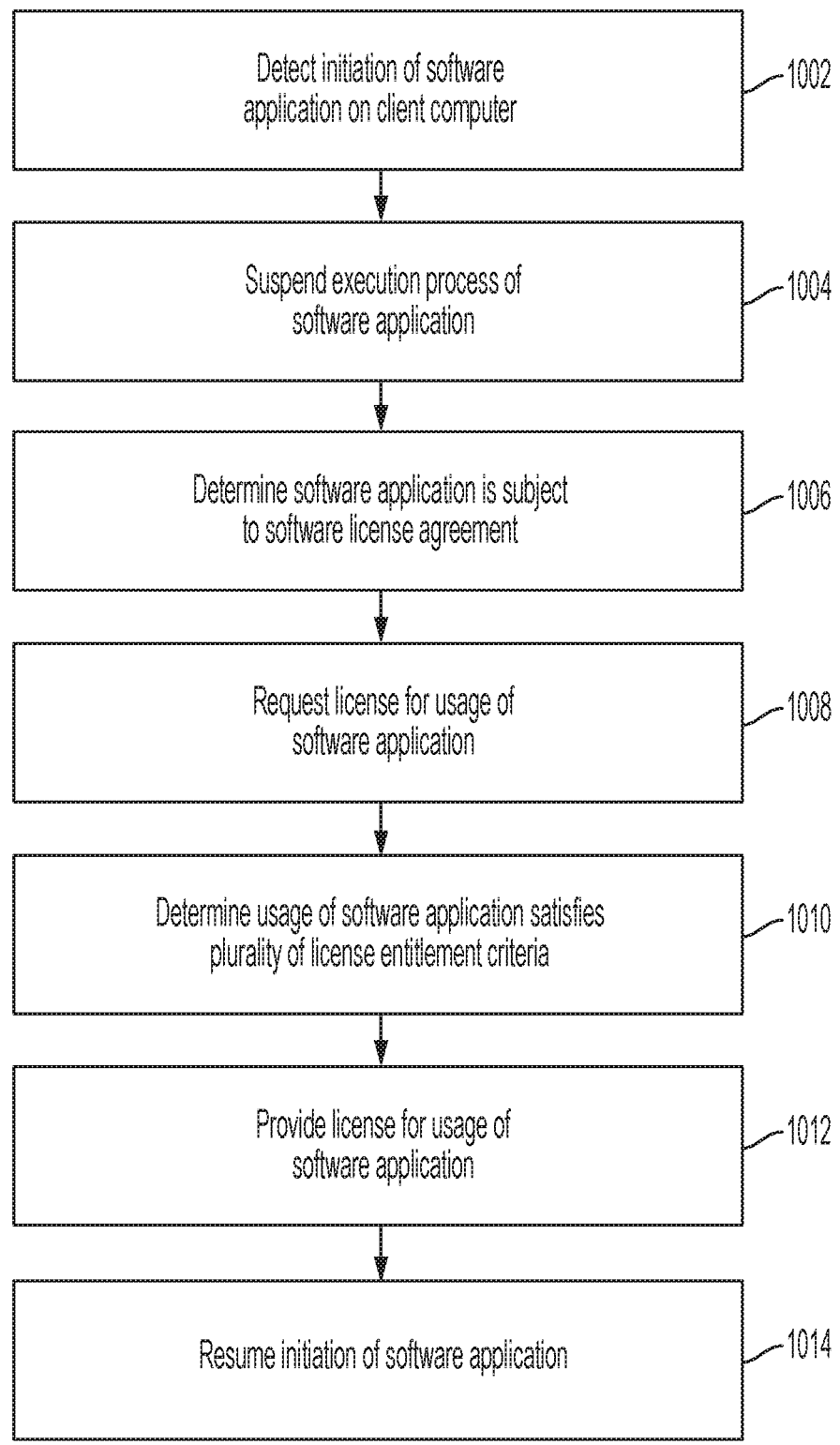
FIG. 10 is a flow diagram of a process for managing software licenses according to some examples.

FIG. 10 is a flow diagram of a process 1000 for managing software licenses according to some examples. Method 1000 may be implemented using a system such as system 100 of FIG. 1, e.g., including license server 102, client 104, director 106, accountant 108, and data warehouse 110.

At 1002, client 104 detects the initiation of a managed software application, e.g., as described above in reference to FIG. 2. Previously, the software application may have been installed using a software installer as described above in reference to FIG. 1.

At 1004, client 104 suspends execution of the software application, e.g., as described above in reference to FIGS. 2 and 3.

At 1006, client 104 determines that the software application is subject to a plurality of software license entitlement criteria defined by at least one software license agreement, e.g., as described above in reference to FIGS. 2 and 3.

At 1008, client 104 requests from license server 102 a license for a usage of the software application, e.g., as described above in reference to FIGS. 2 and 3.

At 1010, license server 102 determines that the usage of the software application satisfies the plurality of license entitlement criteria, e.g., as described above in reference to FIGS. 2 and 3.

At 1012, license server 102 provides a license for the usage of the software application to client 104, e.g., as described above in reference to FIGS. 2 and 3.

At 1014, client 104 resumes the initiation of the software application, e.g., as described above in reference to FIGS. 2 and 3.

II. Execution Type Software License Management

Section II presents techniques for applying the software license management processes described above in Section I to software applications that include multiple executables. As explained in detail below, in such situations, each executable may have a different execution type, described in detail below, for purposes of managing licensing compliance for the software application.

Figure 11:
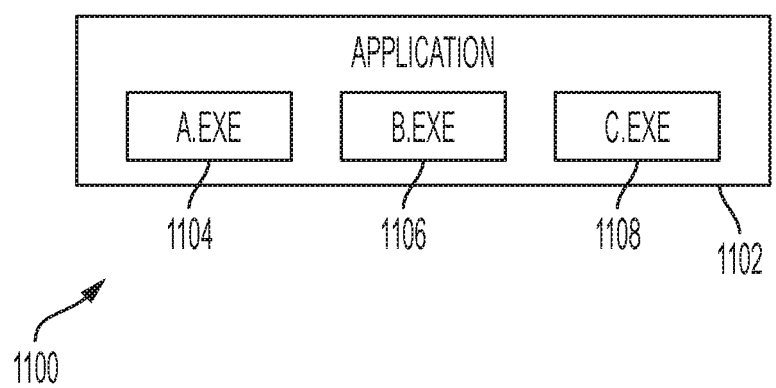
FIG. 11 is a schematic diagram of a software application that includes three different executables according to some examples.

FIG. 11 is a schematic diagram 1100 of a software application 1102 that includes three different executables 1104, 1106, 1108, according to some examples. In general, complex software applications may include multiple executables. By way of non-limiting example, a modeling software application may include an editor executable, a computational engine executable, and a graphical display executable. Managing software licensing for multi-executable applications includes unique challenges. For example, each executable may have different license requirements defined by a software license agreement, the satisfaction of which may depend on whether—and which—executable from the same software application is currently running.

As presented in Section I, some examples manage licensing for, and access to, software applications by intercepting an initiation of an executable, suspending the initiation, and then determining if it is subject to a software license agreement. If the software application is not running, e.g., no executables included in the software application are currently executing, then a license for usage is generally required. However, if the software application is currently running, e.g., at least one executable included in the software application is currently running, then depending on the relevant software license agreement, a license for usage may or may not be required.

Some examples contemplate three execution types, referred to herein as "family," "twin," and "none," for executables that form multi-executable software applications. For the "family" execution type, the relevant software license agreement dictates that if any executable for the software application is running, then an additional license for usage is not required to run another executable for the same software application. For the "twin" execution type, if an instance of the executable that is being initiated is already running, then a license for usage is not required to execute the additional instance; however, if an instance is not currently running, then a license for the executable that is being initiated is required. For the "none" execution type, a license is always required to run any executable, regardless of what other executables for the same software application are already running. Thus, there are some software applications where the determination of whether a license for usage is required is dependent on the current executables running and the type of executable that is being launched.

The designation of an executable type may be made on a executable-by-executable basis. Such designations may be represented as executable type data and stored in respective configuration files kept on the client computer. The designations may be made, and the configuration files formed and stored, when the application is installed using a software installer as described above in reference to FIG. 1.

To illustrate how the execution types are used according to some examples, four scenarios are described presently and depicted according to FIG. 11. The scenarios are presented in order of increasing complexity.

For the first scenario, executables A.EXE 1104, B.EXE 1106, and C.EXE 1108 are all family execution type. A user may launch software application 1102 on the user's client computer. This may initiate A.EXE 1104, which may be suspended until the client computer obtains a license for its usage. The client computer software then retrieves execution type data, which may be stored locally on the client computer in a configuration file. The execution type data indicates that A.EXE 1104 is family execution type. The client computer software determines whether any other executables for application 1102 are currently executing, and, finding that none are, proceeds to check all license entitlement criteria for A.EXE 1104, e.g., per method 1000. For purposes of this example, the criteria are all satisfied and a license for the usage of A. EXE 1104 is checked out.

After the client computer checks out the license for usage of A.EXE 1104 and A.EXE 1104 is permitted to execute on the client computer, e.g., by resuming its initiation from its suspended state, the user may initiate the execution of B.EXE 1106. The client computer software suspends its execution and looks up the execution type for B.EXE 1106, which may be stored at the client computer in a configuration file for application 1102. Per the family execution type, the client computer software determines that no license for using B.EXE 1106 is needed as long as at least one additional executable of application 1102 is currently executing. The client computer software determines that A.EXE 1104 is currently executing on the client computer, therefore it permits B.EXE 1106 to run, e.g., by resuming its initiation. No additional license for usage is checked out, because the client computer already has the license for usage for the family that it obtained when A.EXE 1104 was executed. Once all executables for application 1102 are terminated, the license is checked back in, e.g., to license server 102.

For the second scenario, executables A.EXE 1104, B.EXE 1106, and C.EXE 1108 are all twin execution type. A user may launch software application 1102, which initiates the execution of A.EXE 1104. The client computer software then suspends the execution and obtains the relevant execution type data for A. EXE 1104, which indicates that it is twin. Finding no other instances of A.EXE 1104 executing on the client computer, the system then checks all license entitlement criteria, e.g., using method 1000, and for purposes of illustration, grants a license for its usage, and allows A.EXE 1104 to run on the client computer, e.g., by permitting its suspended initiation to resume.

Next, a user may initiate the execution of B.EXE 1106. The client computer software retrieves execution type data for B.EXE and determines that it is twin. Because no other instances of B.EXE 1006 are currently running, even though an instance of A.EXE 1102 is, the system proceeds with checking the license entitlement criteria for B.EXE 1106, e.g., using method 1000, grants a license for usage, and permits it to execute.

Next, the user may initiate the execution of a second instance of A.EXE 1104. The client computer software checks its execution type, finds twin, and proceeds to check whether another instance of A.EXE 1104 is already running. Finding that one is, the client computer software permits the second instance of A.EXE 1104 to run, but does not provide an additional license to the client computer, because the license for the first instance already covers both.

This process may proceed for a second instance of B.EXE 1106. A user may initiate its execution, which is suspended until the client computer software retrieves its execution type data, finds that it is twin, determines that a first instance of B.EXE 1106 is already running, and permits the second instance to execute without obtaining an additional license for its usage.

Later, after the user terminates both instances of A.EXE 1104, the client computer software checks back in the license for its usage. Similarly, after the user terminates both instances for B.EXE 1106, the client computer checks back in its associated license for its usage.

For the third scenario, executables A.EXE 1104, B.EXE 1106, and C.EXE 1108 are all none execution type. In this case, a license for usage is required for each instance of each executable. Thus, when the user initiates the execution of A.EXE 1104, the client computer software checks its execution type, finds that it is none, proceeds to check all license entitlement criteria, e.g., using method 1000, and for purposes of illustration, grants a license for its usage and allows A.EXE 1104 to run. Each additional instance of A.EXE 1104 requires an additional license for usage. When an instance of A.EXE 1104 is terminated, its respective license for usage is checked back in. Similarly for B.EXE 1106 and C.EXE 1108: when a user initiates their execution, the client computer software determines that they are none execution type, checks their respective license entitlement criteria, e.g., using method 1000, and provides (or denies) respective licenses for usage. When each is terminated, the respective license is checked back in.

For the fourth scenario, executable A.EXE 1104 is family execution type, executable B.EXE 1106 is twin execution type, and executable C.EXE 1108 is none execution type. A user may initiate the execution of A.EXE 1104, which causes a retrieval of its execution type data from a configuration file stored at the client computer, indicating that it is family. Finding that no instance of any executable for the associated application is currently running at the client computer, the system then checks all license entitlement criteria, e.g., using method 1000. Assuming that the criteria are satisfied, the license for usage is checked out and provided to the client computer.

Next, the user may initiate the execution of B.EXE 1106. The client computer software looks up its execution type data, determines that it is twin, and proceeds to check whether any other instance of B.EXE 1106 is currently executing. Finding none, the system proceeds to check all license entitlement criteria, e.g., using method 1000. If satisfied, then an instance of B.EXE 1106 is permitted to execute. The user may then initiate the execution of C.EXE 1108. The client computer software retrieves the relevant execution type data, determines that C.EXE 1108 is none execution type, and proceeds to go through the process of considering license entitlement criteria, e.g., using method 1000, without needing to check whether any other executables are currently running. Assuming that the criteria are satisfied, C.EXE 1108 is permitted to execute.

The user may then initiate the execution of another instance of A.EXE 1104. Because A.EXE 1104 is a family execution type, the client computer software determines that an instance of A.EXE 1104 is already running, and allows the second instance of A.EXE 1104 to execute without checking the license entitlement criteria and without checking out an additional license for usage. Note that because A.EXE 1104 is family, the client computer software could have permitted the second instance of A.EXE 1104 to execute based on the presence of executing instances of B.EXE 1106 or C.EXE 1108 instead of based on the first instance of A. EXE 1104.

The user may also initiate a second instance of B.EXE 1106. Because B.EXE 1106 is twin, the client computer software checks for, and finds, an executing instance of B.EXE 1106 on the client computer. Based on that, it permits a second instance of B.EXE to 1106 run without checking the license entitlement criteria. Note that because B.EXE 1106 is twin, it is irrelevant to the determination of whether to allow it to execute that instances of A.EXE 1104 and C.EXE 1108 are already running.

The user may also initiate a second instance of C.EXE 1108. Because C.EXE 1108 is none execution type, the system proceeds with the process of considering license entitlement criteria, e.g., using method 1000, without needing to check whether any other executables are currently running.

The license for usage that covers both instances of family execution type A.EXE 1104 is not checked in until after both instances are terminated. Similarly, the license for usage that covers both instances of twin execution type B.EXE 1106 is not checked in until after both instances are terminated. By contrast, each respective license for the two executing instances of none execution type C.EXE 1108 is checked back in when its respective instance of C.EXE 1108 is terminated.

Note that the four scenarios described above are illustrative rather than limiting. For example, any number of executable instances may be handled, not limited to one or two. Further, elements of the above scenarios may be combined. For example, a particular software application may include any number of family, twin, and none executables, in any proportion, and such an application may be managed according to the disclosed techniques.

Figure 12:
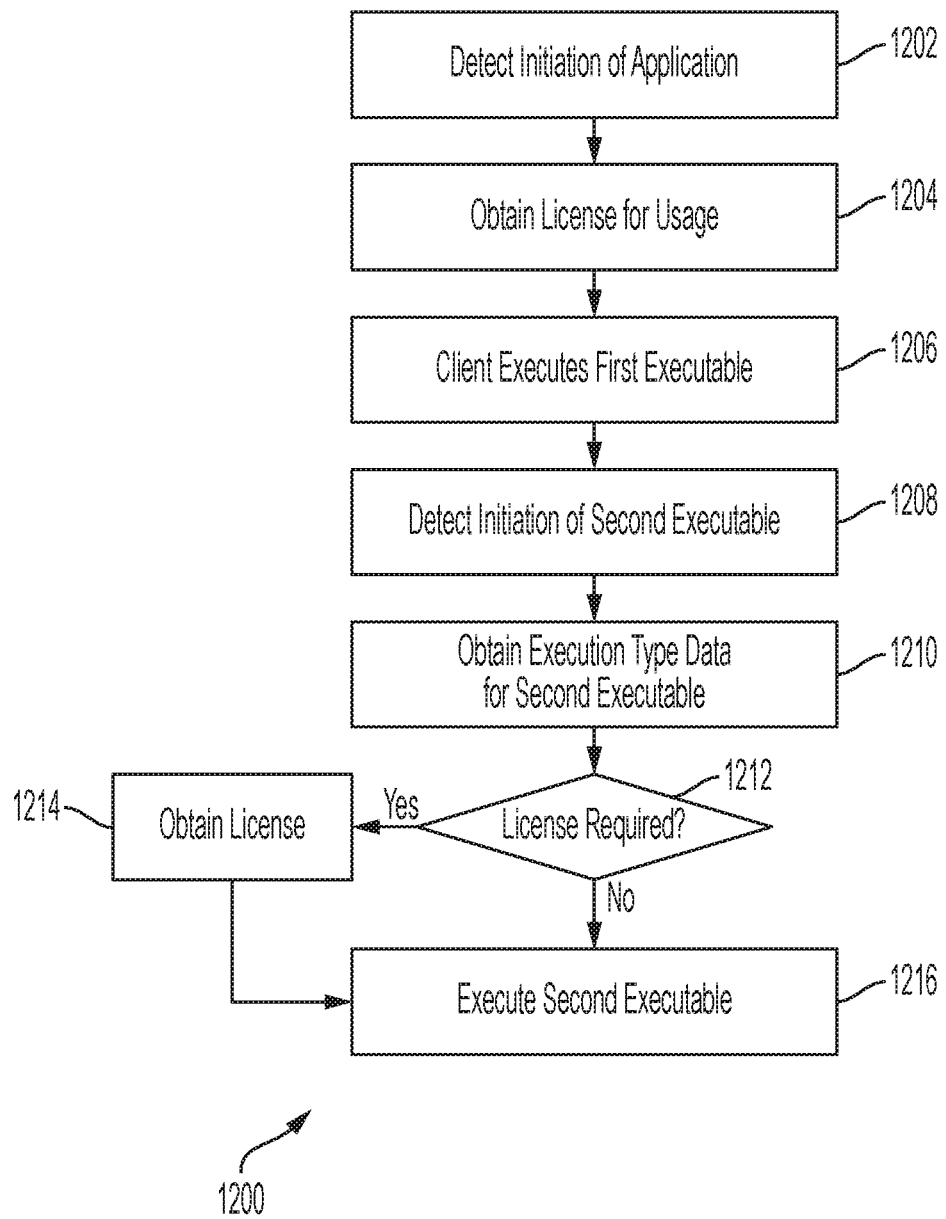
FIG. 12 is a flow diagram of a method for managing licensing of a software application that includes a plurality of executables according to some examples.

FIG. 12 is a flow diagram of a method 1200 for managing licensing of a software application that includes a plurality of executables according to some examples. Method 1200 may be implemented using a system such as system 100 of FIG. 1, e.g., including license server 102 and client 104.

At 1202, client software executing on a client computer such as client 104 detects an initiation, on the client computer, of a software application that includes a plurality of executables. The actions of 1202 are similar to the actions of 1002 of method 1000, as described above.

At 1204, the client computer obtains a license for usage of a first executable of the plurality of executables that make up the software application. The actions of 1200 may correspond to some actions shown and described above in Section I, e.g., method 1000.

At 1206, the client computer software permits the executable to execute, e.g., as described above with respect to 1014 of method 1000.

At 1208, the client computer software detects an initiation of at least a second executable of the plurality of executables on the client computer. The actions of 1202 are similar to the actions of 1002 of method 1000, described above in reference to FIG. 10.

At 1210, the client computer software obtains execution type data for the second executable. The execution type data may be stored at the client computer in a configuration file generated when the software application, of which the first and second executables are part, is installed. The execution type data may specify the execution type of the executable, which may be family, twin, or none. For none, the execution type data may represent that a license for a usage of the second executable is always required. For twin, the execution type data may represent that a license for a usage of the second executable is not required if an instance of the second executable is executing on the client computer. For family, the execution type data may represent that a license for a usage of the second executable is not required if at least one executable of the plurality of executables that make up the software application is executing on the client computer.

At 1212, the client computer software determines, based on the execution type data, whether a license for a usage of the second executable is required. If a license for a usage of the second executable is required, then control passes to 1214, where the system proceeds to obtain such a license for usage, e.g., according to method 1000 of FIG. 10, after which control passes to 1216. Otherwise, if a license for a usage of the second executable is not required, then control passes directly to 1216.

At 1216, the client software executes the second executable. This may occur as the client computer software resuming the initiation of the executable which was previously suspended, e.g., as described above in reference to 1004 and 1014 of method 1000.

The present disclosure is not to be limited in terms of the particular examples described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is for the purpose of describing particular examples only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." In addition, where features or aspects of the disclosure are described in terms of Markush groups, those skilled in the art will recognize that the disclosure is also thereby described in terms of any individual member or subgroup of members of the Markush group.

While various aspects and examples have been disclosed herein, other aspects and examples will be apparent to those skilled in the art. The various aspects and examples disclosed herein are for purposes of illustration and are not intended to be limiting, with the true scope and spirit being indicated by the following claims.

What is claimed is:

1. A method of managing licensing of a software application comprising a plurality of executables, the method comprising:

detecting an initiation of the software application on a client computer;

obtaining, by the client computer, at least a license for a usage of a first executable of the plurality of executables, wherein the client computer executes at least the first executable of the plurality of executables;

detecting an initiation of at least a second executable of the plurality of executables on the client computer;

suspending the initiation of the second executable;

obtaining execution type data for the second executable from a configuration file, wherein the execution type data specifies one of: a license for a usage of the second executable is not required if an instance of the second executable is executing on the client computer, or a license for a usage of the second executable is not required if at least one executable of the plurality of executables is executing on the client computer;

determining, based on the execution type data, that a license for a usage of the second executable is not required; and executing the second executable without checking a license for usage of the second executable.

2. The method of claim 1, wherein:

the execution type data specifies that a license for a usage of the second executable is not required if an instance of the second executable is executing on the client computer; and the determining comprises determining that the first executable comprises an instance of the second executable.

3. The method of claim 2, further comprising checking in the license for the usage of the first executable once both the first executable and the second executable are not executing.

4. The method of claim 1, wherein:

the execution type data specifies that a license for a usage of the second executable is not required if at least one executable of the plurality of executables is executing on the client computer; and the determining comprises determining that the first executable is executing on the client computer.

5. The method of claim 4, further comprising checking in the license for the usage of the first executable once all executables of the plurality of executables are not executing.

6. The method of claim 1, further comprising:

detecting an initiation of at least a third executable of the plurality of executables on the client computer;

obtaining execution type data for the third executable, wherein the execution type data specifies that a license for a usage of the third executable is always required;

obtaining a license for a usage of the third executable; and executing the third executable.

7. The method of claim 1, wherein the plurality of executables comprise at least two of:

a third executable, wherein the third executable has associated execution type data for the third executable stored at the client computer, wherein the execution type data for the third executable specifies that a license for a usage of the third executable is not required if an instance of the third executable is executing on the client computer;

a fourth executable, wherein the fourth executable has associated execution type data for the fourth executable stored at the client computer, where in the execution type data for the third executable specifies that a license for a usage of the fourth executable is not required if at least one executable of the plurality of executables is executing on the client computer; or a fifth executable, wherein the fifth executable has associated execution type data for the fifth executable stored at the client computer, wherein the execution type data for the fifth executable specifies that a license for a usage of the fifth executable is always required.

8. The method of claim 1, wherein the obtaining the license for the usage of at least the first executable of the plurality of executables on the client computer comprises:

determining that the software application is subject to a plurality of software license entitlement criteria defined by at least one software license agreement for the software application;

requesting, from a server computer, a license for a usage of the software application on the client computer; and determining, by the server computer, that the usage of the software application on the client computer satisfies the plurality of software license entitlement criteria.

9. The method of claim 1, further comprising:

suspending an execution process of the software application subsequent to the detecting the initiation of the software application on the client computer; and resuming the execution process of the software application in response to the obtaining the license for the usage the first executable of the plurality of executables on the client computer.

10. The method of claim 1, wherein the configuration file is stored at the client computer.

11. A system for managing licensing of a software application comprising a plurality of executables, the system comprising a client computer with computer executable software for tracking usage of the software application installed on the client, the client computer configured by the computer executable software for tracking usage of the software application to perform actions comprising:

detecting an initiation of the software application on the client computer;

obtaining, by the client computer, at least a license for a usage of a first executable of the plurality of executables, wherein the client computer executes at least the first executable of the plurality of executables;

detecting an initiation of at least a second executable of the plurality of executables on the client computer;

suspending the initiation of the second executable;

obtaining execution type data for the second executable from a configuration file, wherein the execution type data specifies one of: a license for a usage of the second executable is not required if an instance of the second executable is executing on the client computer, or a license for a usage of the second executable is not required if at least one executable of the plurality of executables is executing on the client computer;

determining, based on the execution type data, that a license for a usage of the second executable is not required; and executing the second executable without checking a license for usage of the second executable.

12. The system of claim 11, wherein:

the execution type data specifies that a license for a usage of the second executable is not required if an instance of the second executable is executing on the client computer; and the determining comprises determining that the first executable comprises an instance of the second executable.

13. The system of claim 12, wherein the actions further comprise checking in the license for the usage of the first executable once both the first executable and the second executable are not executing.

14. The system of claim 11, wherein:

the execution type data specifies that a license for a usage of the second executable is not required if at least one executable of the plurality of executables is executing on the client computer; and the determining comprises determining that the first executable is executing on the client computer.

15. The system of claim 14, wherein the actions further comprise checking in the license for the usage of the first executable once all executables of the plurality of executables are not executing.

16. The system of claim 11, wherein the actions further comprise:

detecting an initiation of at least a third executable of the plurality of executables on the client computer;

obtaining execution type data for the third executable, wherein the execution type data specifies that a license for a usage of the third executable is always required;
obtaining a license for a usage of the third executable; and
executing the third executable.

17. The system of claim 11, wherein the plurality of executables comprise at least two of:
a third executable, wherein the third executable has associated execution type data for the third executable stored at the client computer, wherein the execution type data for the third executable specifies that a license for a usage of the third executable is not required if an instance of the third executable is executing on the client computer;
a fourth executable, wherein the fourth executable has associated execution type data for the fourth executable stored at the client computer, where in the execution type data for the third executable specifies that a license for a usage of the fourth executable is not required if at least one executable of the plurality of executables is executing on the client computer; or
a fifth executable, wherein the fifth executable has associated execution type data for the fifth executable stored at the client computer, wherein the execution type data for the fifth executable specifies that a license for a usage of the fifth executable is always required.

18. The system of claim 11, wherein the obtaining the license for the usage of at least the first executable of the plurality of executables on the client computer comprises:
determining that the software application is subject to a plurality of software license entitlement criteria defined by at least one software license agreement for the software application;
requesting, from a server computer, a license for a usage of the software application on the client computer; and
determining, by the server computer, that the usage of the software application on the client computer satisfies the plurality of software license entitlement criteria.

19. The system of claim 11, wherein the actions further comprise:
suspending an execution process of the software application subsequent to the detecting the initiation of the software application on the client computer; and
resuming the execution process of the software application in response to the obtaining the license for the usage the first executable of the plurality of executables on the client computer.

20. The system of claim 11, wherein the configuration file is stored at the client computer.

\* \* \* \* \*